United States Patent
Seo

(10) Patent No.: US 9,591,596 B2
(45) Date of Patent: Mar. 7, 2017

(54) METHOD FOR TRANSMITTING AND RECEIVING SIGNAL IN WIRELESS COMMUNICATION SYSTEM AND APPARATUS FOR SAME

(71) Applicant: LG ELECTRONICS INC., Seoul (KR)

(72) Inventor: Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/910,625

(22) PCT Filed: Aug. 6, 2014

(86) PCT No.: PCT/KR2014/007273
§ 371 (c)(1),
(2) Date: Feb. 5, 2016

(87) PCT Pub. No.: WO2015/020428
PCT Pub. Date: Feb. 12, 2015

(65) Prior Publication Data
US 2016/0183204 A1    Jun. 23, 2016

Related U.S. Application Data

(60) Provisional application No. 61/863,874, filed on Aug. 8, 2013, provisional application No. 61/868,046, filed on Aug. 20, 2013.

(51) Int. Cl.
*H04B 1/04*      (2006.01)
*H04W 52/52*     (2009.01)
(Continued)

(52) U.S. Cl.
CPC .......... *H04W 52/52* (2013.01); *H04L 5/0048* (2013.01); *H04L 27/2613* (2013.01);
(Continued)

(58) Field of Classification Search
CPC ... H04L 27/2613; H04L 5/0048; H04L 27/26; H04L 5/0023; H04L 25/023; H04L 27/2692
(Continued)

(56) References Cited

U.S. PATENT DOCUMENTS 7,738,355 B1 *   6/2010   Goh ...................... H04L 25/022
                                                    370/204
2008/0165892 A1 * 7/2008   Yang ................... H04L 27/2647
                                                    375/299
(Continued)

FOREIGN PATENT DOCUMENTS

WO    WO 2012/034269 A1    3/2012

*Primary Examiner* — Keith Ferguson
(74) *Attorney, Agent, or Firm* — Birch, Stewart, Kolasch & Birch, LLP

(57) ABSTRACT

A method is provided for transmitting a signal from a transmitting end to a receiving end in a wireless communication system. A preamble and the signal are transmitted. A length of the preamble is determined based on a bandwidth of the wireless communication system. The preamble is used for an automatic gain control of the signal. The preamble is transmitted in either a first symbol or a last symbol included in at least one subframe having the signal transmitted therein. A prescribed sample of either the first symbol or the last symbol is nulled by the receiving end and wherein the prescribed sample is included in a guard interval.

9 Claims, 20 Drawing Sheets

(51) Int. Cl.
*H04L 5/00* (2006.01)
*H04L 27/26* (2006.01)
*H04L 12/26* (2006.01)

(52) U.S. Cl.
CPC ...... *H04L 27/2646* (2013.01); *H04L 27/2694* (2013.01); *H04L 43/0882* (2013.01)

(58) Field of Classification Search
USPC ... 455/127.1, 127.2, 245.1, 138, 232.1, 136, 455/69, 522, 422.1, 403, 445, 67.11, 455/550.1, 508, 561, 500, 517, 426.1, 455/426.2; 370/208, 329, 310, 280; 375/345, 340
See application file for complete search history.

(56) References Cited

U.S. PATENT DOCUMENTS

| | | |
|---|---|---|
| 2009/0016353 A1 | 1/2009 | Li et al. |
| 2009/0116430 A1 | 5/2009 | Bonta et al. |
| 2011/0268101 A1 | 11/2011 | Wang et al. |
| 2012/0218991 A1 | 8/2012 | Mueller |
| 2013/0315152 A1* | 11/2013 | Ratasuk .............. H04W 76/023 370/329 |

* cited by examiner

FIG. 5
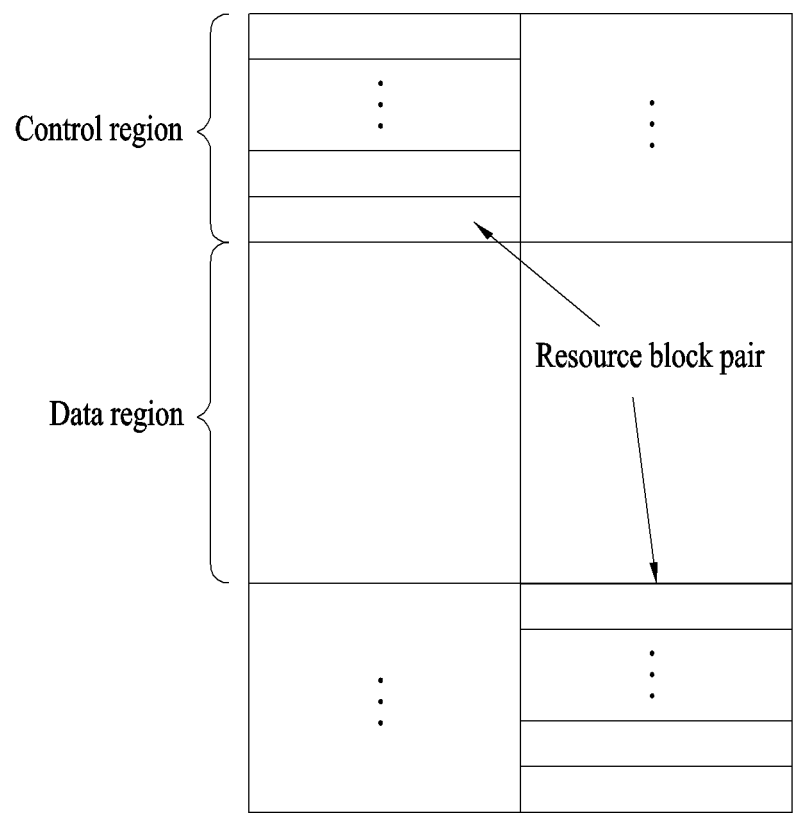
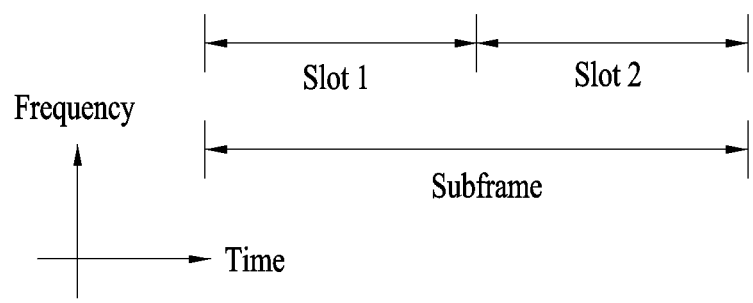

FIG. 6
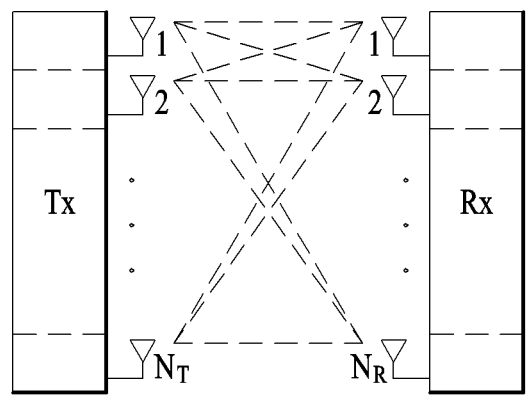
(a)
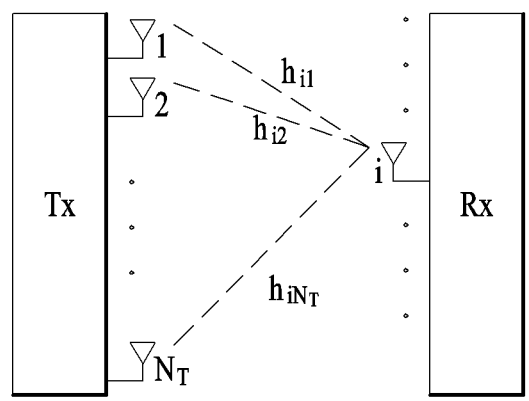
(b)

FIG. 7
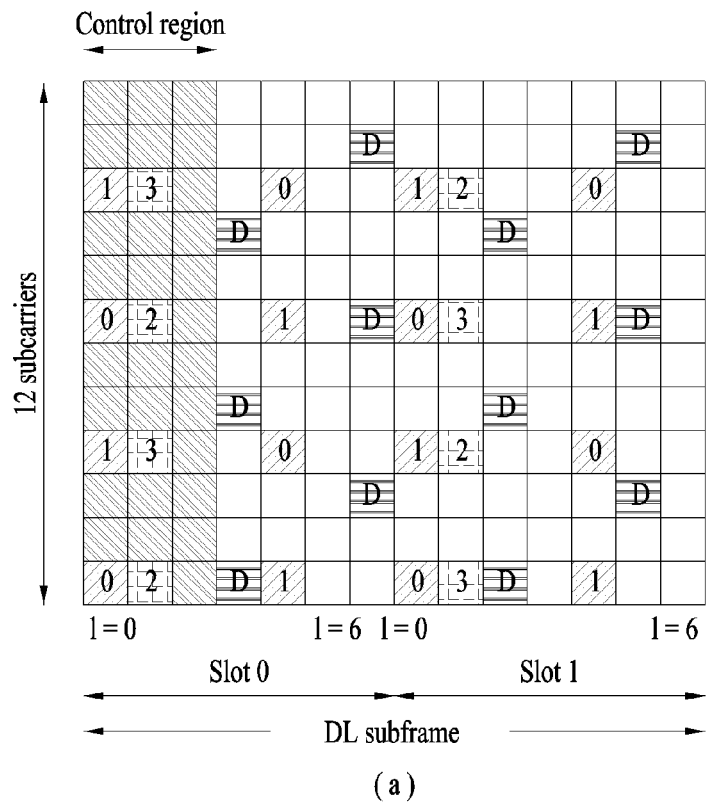
(a)
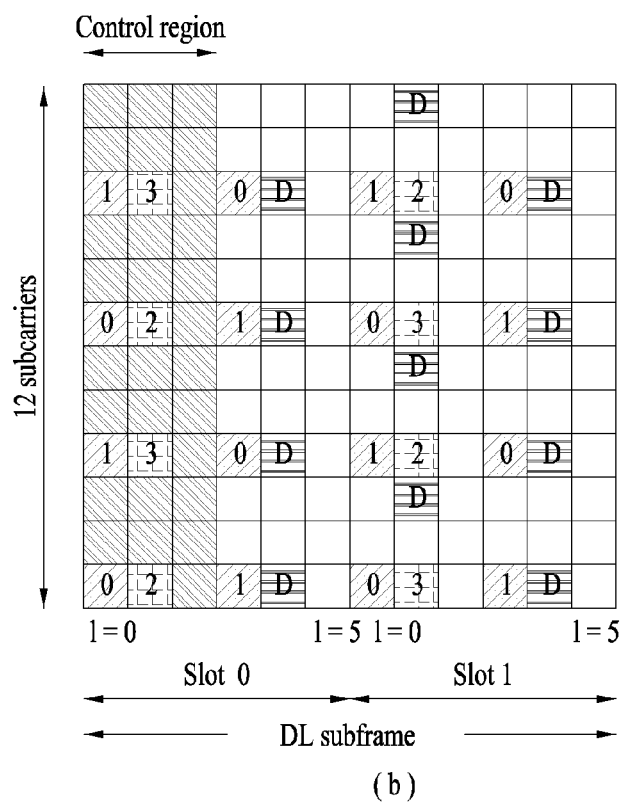
(b)

METHOD FOR TRANSMITTING AND RECEIVING SIGNAL IN WIRELESS COMMUNICATION SYSTEM AND APPARATUS FOR SAME

CROSS REFERENCE TO RELATED APPLICATIONS

This application is the National Phase of PCT/KR2014/007273 filed on Aug. 6, 2014, which claims priority under 35 U.S.C. 119(e) to U.S. Provisional Application No. 61/863,874 filed on Aug. 8, 2013 and U.S. Provisional Application No. 61/868,046 filed on Aug. 20, 2013, all of which are hereby expressly incorporated by reference into the present application.

TECHNICAL FIELD

The present invention relates to a wireless communication system, and more particularly, to a method of transmitting and receiving a signal in a wireless communication system and apparatus therefor.

BACKGROUND ART

3GPP LTE ($3^{rd}$ generation partnership projecting long term evolution) communication system is schematically described for one example of a wireless communication system to which the present invention is applicable.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '$3^{rd}$ Generation Partnership Project: Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. To this end, reduction of cost per bit, service availability increase, flexible frequency band use, simple-structure and open interface, reasonable power consumption of user equipment and the like are required.

Thus, the increase of data traffic consumed through a recent LTE service due to the development of the wireless communication technology has been pointed out as one problem. Hence, required is a method of expanding data capacity, which can be provided by a network without massive facility investments while satisfying the demand for client's data use. In this context, there is an ongoing movement for off-loading wireless data traffic concentrated on 3G or LTE network using the wireless LAN communication system available on an unlicensed band such as ISM (Industrial, Scientific and Medical) band. The concept of the unlicensed band is described as follows.

First of all, unlicensed bands or license-free spectrums mean the radio spectrums available for everyone without licenses. For instance, the unlicensed bands normally used in U.S.A. mean the bands of 900 MHz, 2.4 GHz, 5.2/5.3/5.8 GHz, 24 GHz, 69 GHz or higher. Other countries may have different frequency bands according to the rules for the unlicensed bands. For example, the unlicensed bands may include ISM (Industrial, Scientific and Medical) band and TVWS (Television White Space) band. In addition, previously unused radio spectrums tend to become unlicensed bands owing to various technological reasons or technical changes. Since a frequency of such an unlicensed band is higher than frequencies used by most of licensed bands and a transmission power of a base station is relatively low, the unlicensed band may be appropriate for the implementation of a small cell capable of servicing an area in small size effectively. Moreover, since a communication service provider does not secure an exclusive frequency use right, an unlicensed band is advantageous in sharing a considerable level of capacity with a low cost incomparable with that of a network establishment on a licensed band.

However, it is difficult for an unlicensed band to secure a communication quality on a level that can be provided by a communication service on a licensed band. Moreover, although the standardization for the linkage between HSPA or LTE service corresponding to 3GPP standard technology and Wi-Fi corresponding to IEEE standard technology is in progress, it is disadvantageous in having difficulty in providing a perfectly integrated service in aspects of handover, QoS guarantee and the like. To solve these problems, the ongoing discussion about LTE technology (LTE-U: LTE on Unlicensed Spectrum or U-LTE) on an unlicensed band is in progress.

DISCLOSURE OF THE INVENTION

Technical Task

Based on the above-mentioned discussions, the technical task of the present invention is to provide a method of transmitting and receiving a signal in a wireless communication system and apparatus therefor.

Technical Solutions

In one technical aspect of the present invention, provided herein is a method of transmitting a signal from a transmitting end to a receiving end in a wireless communication system, the steps of transmitting a preamble and transmitting the signal. In this case, a length of the preamble is determined based on a bandwidth of the wireless communication system and the preamble is used for an automatic gain control of the signal.

Preferably, the preamble is transmitted in either a first symbol or a last symbol included in at least one subframe having the signal transmitted therein. More preferably, a prescribed sample of either the first symbol or the last symbol is nulled by the receiving end and wherein the prescribed sample is included in a guard interval.

Preferably, the method further includes the step of transmitting a reference signal to the receiving end. In this case, the reference signal is transmitted in at least one of the rest of symbols except either the first symbol or the last symbol.

In another technical aspect of the present invention, provided herein is a method of receiving a signal transmitted from a transmitting end to a receiving end in a wireless communication system, including the steps of receiving a preamble and receiving the signal. In this case, a length of the preamble is determined based on a bandwidth of the wireless communication system and the preamble is used for an automatic gain control of the signal.

Preferably, the preamble is transmitted in either a first symbol or a last symbol included in at least one subframe having the signal transmitted therein.

Preferably, the step of receiving the signal from the transmitting end includes the step of nulling a prescribed sample of either the first symbol or the last symbol. In this case, the prescribed sample is included in a guard interval.

Preferably, the method further includes the step of receiving a reference signal from the transmitting end. In this case, the reference signal is transmitted in at least one of the rest of symbols except either the first symbol or the last symbol.

In another technical aspect of the present invention, provided herein is a method of transmitting a signal from a transmitting end to a receiving end in a wireless communication system, including the steps of: assigning a specific subframe for a transmission of the signal, determining a timing margin for the transmission of the signal, determining an available symbol and transmission timing point of the specific subframe based on the timing margin value, and transmitting the signal through the available symbol at the transmission timing point.

Preferably, if a timing advance applied to the receiving end is greater than the timing margin, the available symbol corresponds to symbols except 2 symbols in the specific subframe. If the timing advance applied to the receiving end is smaller than the timing margin, the available symbol corresponds to symbols except 1 symbol in the specific subframe.

Preferably, the timing margin amounts to a difference value between 1 symbol duration and a sum of a guard interval for an operation switching from a preceding subframe to the specific subframe and a guard interval value for an operation switching from the specific subframe to a following subframe.

Preferably, the method further includes the step of transmitting a preamble. In this case, the timing margin amounts to a difference value between 1 symbol duration and a sum of a guard interval for an operation switching from a preceding subframe to the specific subframe, a guard interval value for an operation switching from the specific subframe to a following subframe and a value of the preamble.

The aforementioned general description of the present invention and the following detailed description of the present invention are exemplarily provided for the additional description of the invention disclosed in the appended claims.

Advantageous Effects

According to the present invention, signals can be further transceived in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for a structure of an uplink subframe.

FIG. 6 is a diagram for a configuration of a wireless communication system having multiple antennas (MIMO).

FIG. 7 is a diagram to describe a downlink reference signal.

BEST MODE FOR INVENTION

Figure 1:
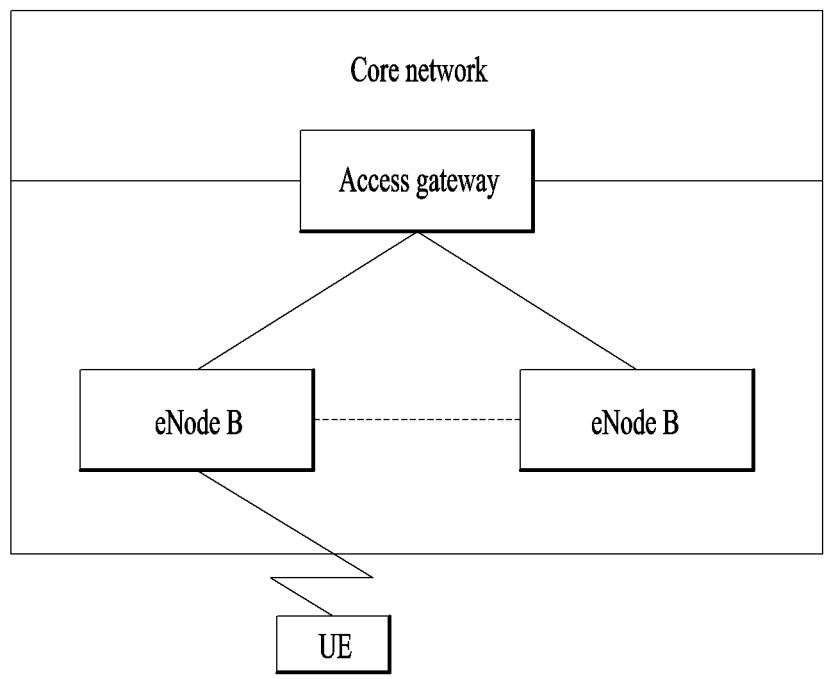
FIG. 1 is a schematic diagram for a wireless communication system structure.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a Base Station (BS) and a terminal. In this case, the BS is used as a terminal node of a network via which the BS can directly communicate with the terminal. Specific operations to be conducted by the BS in the present invention may also be conducted by an upper node of the BS as necessary.

In other words, it will be obvious to those skilled in the art that various operations for enabling the BS to communicate with the terminal in a network composed of several network nodes including the BS will be conducted by the BS or other network nodes other than the BS. The term "BS" may be replaced with a fixed station, Node B, evolved Node B (eNB or eNode B), or an Access Point (AP) as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Embodiments of the present invention are supported by standard documents disclosed for at least one of wireless access systems including an Institute of Electrical and Electronics Engineers (IEEE) 802 system, a 3rd Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and the like. CDMA may be embodied with wireless (or radio) technology such as Universal Terrestrial Radio Access (UTRA) or CDMA2000. TDMA may be embodied with wireless (or radio) technology such as Global System for Mobile communications (GSM)/General Packet Radio Service (GPRS)/Enhanced Data Rates for GSM Evolution (EDGE). OFDMA may be embodied with wireless (or radio) technology such as Institute of Electrical and Electronics Engineers (IEEE) 802.11 (Wi-Fi), IEEE 802.16 (WiMAX), IEEE 802-20, and Evolved UTRA (E-UTRA). UTRA is a part of Universal Mobile Telecommunications System (UMTS). 3rd Generation Partnership Project Long Term Evolution (3GPP LTE) is a part of Evolved UMTS (E-UMTS), which uses E-UTRA. 3GPP LTE employs OFDMA in downlink and employs SC-FDMA in uplink. LTE-Advanced (LTE-A) is an evolution of 3GPP LTE. WiMAX can be explained by an IEEE 802.16e (WirelessMAN-OFDMA Reference System) and an advanced IEEE 802.16m (WirelessMAN-OFDMA Advanced System).

For clarity, the following description focuses on the 3GPP LTE and LTE-A systems. However, the technical features of the present invention are not limited thereto.

The structure of a radio frame of 3GPP LTE system will be described with reference to FIG. 2.

In a cellular Orthogonal Frequency Division Multiplexing (OFDM) radio packet communication system, uplink/downlink data packets are transmitted in subframes. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

Figure 2:
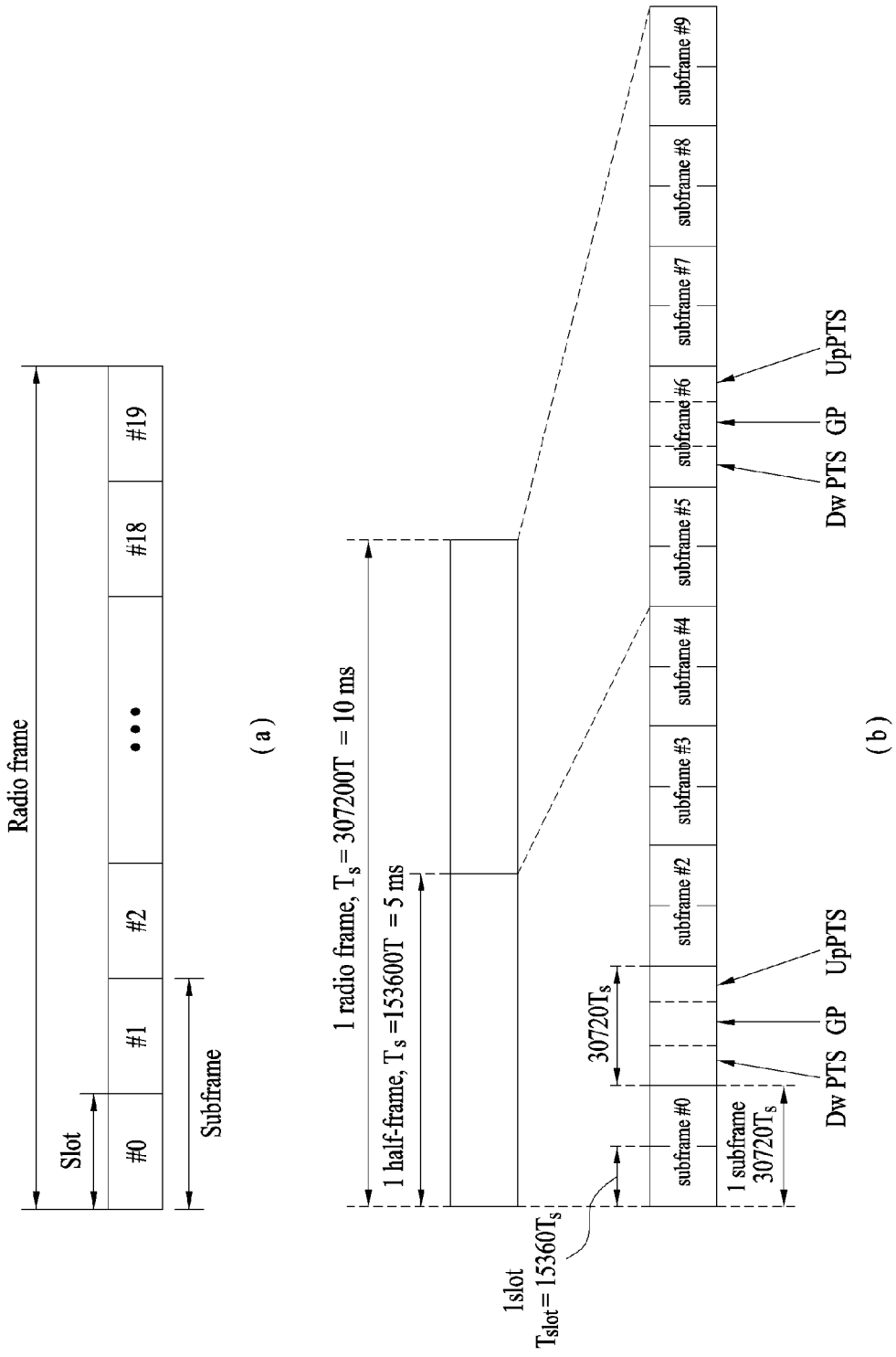
FIG. 2 is a diagram for a structure of 3GPP LTE radio frame.

FIG. 2(*a*) is a diagram illustrating the structure of the type 1 radio frame. A radio frame includes 10 subframes, and one subframe includes two slots in the time domain. A time required for transmitting one subframe is defined as a Transmission Time Interval (TTI). For example, one subframe may have a length of 1 ms and one slot may have a length of 0.5 ms. One slot may include a plurality of OFDM symbols in the time domain and include a plurality of Resource Blocks (RBs) in the frequency domain. Since the 3GPP LTE system uses OFDMA in downlink, the OFDM symbol indicates one symbol duration. The OFDM symbol may be called an SC-FDMA symbol or symbol duration. An RB is a resource allocation unit including a plurality of contiguous subcarriers in one slot.

The number of OFDM symbols included in one slot may be changed according to the configuration of a Cyclic Prefix (CP). There are an extended CP and a normal CP. For example, the number of OFDM symbols included in one slot may be seven in case of a normal CP. In case of an extended CP, the length of one OFDM symbol is increased and thus the number of OFDM symbols included in one slot is less than that in case of a normal CP. In case of the extended CP, for example, the number of OFDM symbols included in one slot may be six. If a channel state is instable as is the case when a UE moves fast, the extended CP may be used in order to further reduce interference between symbols.

FIG. 2(*b*) A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization of a UE at an eNB. The GP is a period between an uplink and a downlink, which eliminates uplink interference caused by multipath delay of a downlink signal. One subframe includes two slots irrespective of the type of a radio frame.

In the LTE TDD system, uplink/downlink subframe configurations (UL/DL configurations) are given as shown in Table 1 below.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe, and S denotes the special subframe. Table 1 also shows downlink-to-uplink switch-point periodicity in uplink/downlink subframe configuration of each system.

Supported uplink/downlink subframes are shown in Table 1. For subframes of a radio frame, "D" denotes a subframe reserved for downlink transmission, "U" denotes a subframe reserved for uplink transmission, "S" denotes a special subframe including a downlink pilot time slot (DwPTS), a guard period (GP) and an uplink pilot slot (UpPTS).

The current 3GPP standard document defines configuration of the special subframe as shown in Table 2 below. Table 2 shows DwPTS and UpPTS given when TS=1/(15000*2048), and the other region is configured as a GP.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

The illustrated radio frame structures are merely examples, and various modifications may be made to the number of subframes included in a radio frame, the number of slots included in a subframe, or the number of symbols included in a slot.

Figure 3:
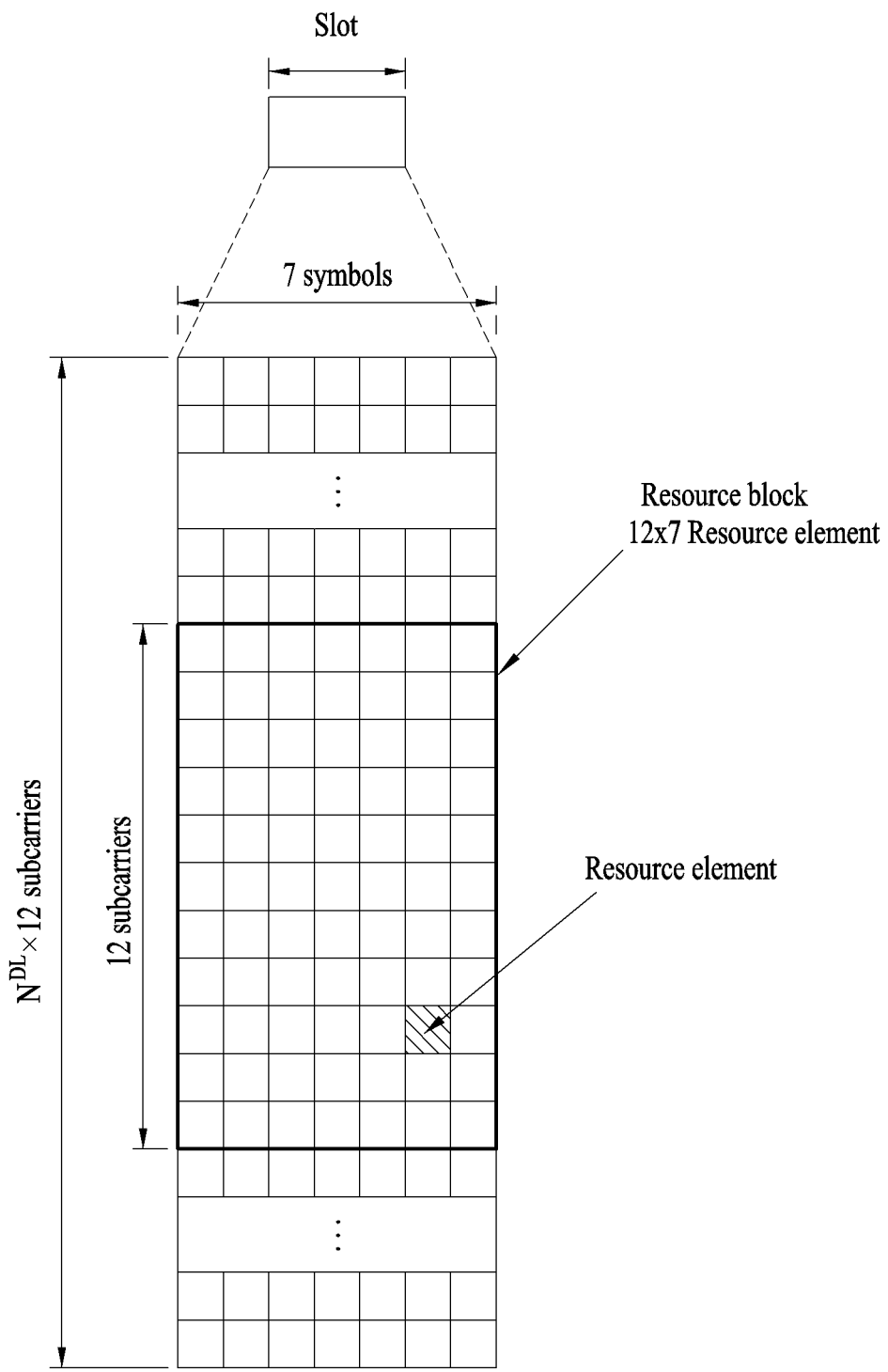
FIG. 3 is a diagram of a resource grid in a downlink slot.

FIG. 3 is a diagram illustrating a resource grid of a downlink slot. A downlink slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number NDL of RBs included in a downlink slot depends on a downlink transmission bandwidth. An uplink slot may have the same structure as a downlink slot.

Figure 4:
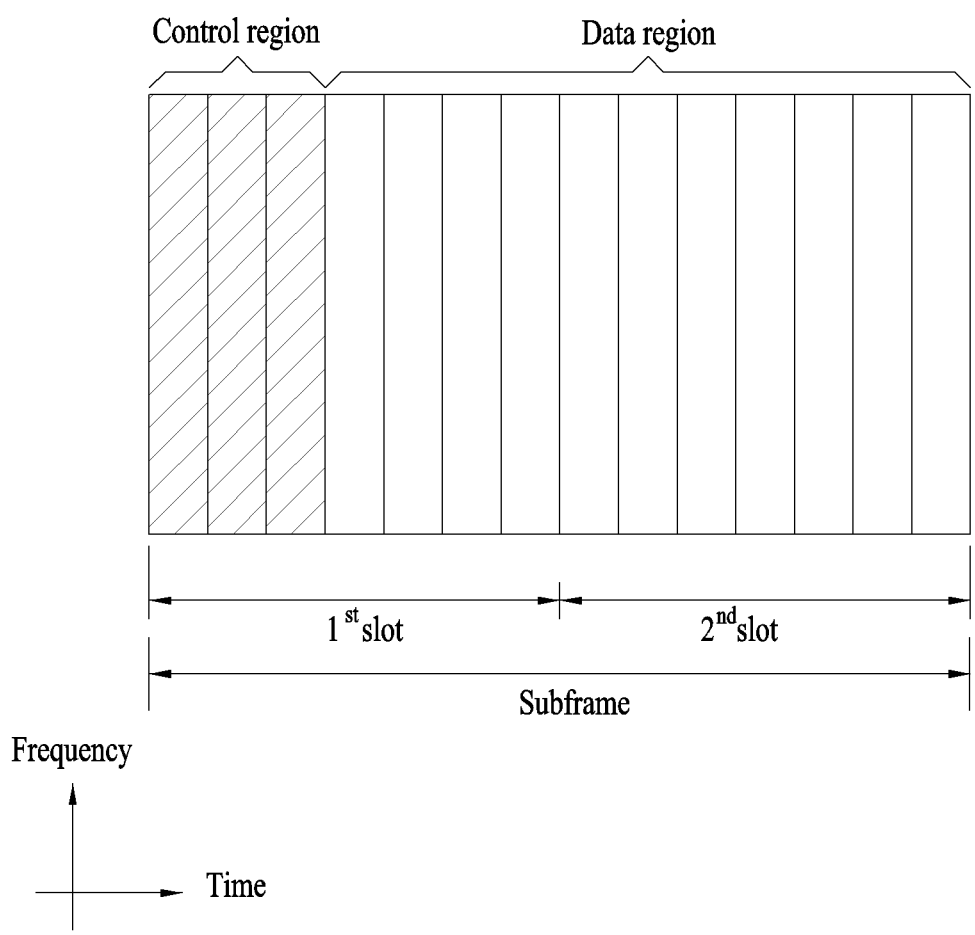
FIG. 4 is a diagram for a structure of a downlink subframe.

FIG. 4 is a diagram illustrating the structure of a downlink subframe. Up to three OFDM symbols at the start of a first slot of one subframe corresponds to a control region to which a control channel is allocated. The remaining OFDM symbols correspond to a data region to which a Physical Downlink Shared Channel (PDSCH) is allocated. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is located in the first OFDM symbol of a subframe, carrying information about the number of OFDM symbols used for control channels in the subframe. The PHICH includes a HARQ ACKnowledgment/Negative ACKnowledgment (ACK/NACK) signal as a response to an uplink transmission. The control information transmitted on the PDCCH is referred to as Downlink Control Information (DCI). The DCI includes uplink or downlink scheduling information or an uplink transmit power control command for a certain UE group. The PDCCH may include information about resource allocation and transmission format of a Downlink Shared Channel (DL-SCH), resource allocation information of an Uplink Shared Channel (UL-SCH), paging information of a Paging Channel (PCH), system information on the DL-SCH, information about resource allocation of an higher layer control message such as a Random Access Response (RAR) transmitted on the PDSCH, a set of transmit power control commands for individual UEs in a certain UE group, transmit power control information, information about activation of Voice over IP (VoIP), etc. A plurality of PDCCHs may be transmitted in the control region. A UE may monitor the plurality of PDCCHs. The PDCCHs are transmitted on an aggregation of one or several contiguous Control Channel Elements (CCEs). A CCE is a logical allocation unit used to provide the PDCCHs at a coding rate based on the state of a radio channel. The CCE includes a set of REs. A format and the number of available bits for the PDCCH are determined based on the correlation between the number of CCEs and the coding rate provided by the CCEs. The BS determines a PDCCH format according to DCI to be transmitted to the UE, and attaches a Cyclic Redundancy Check (CRC) to control information. The CRC is masked by a Radio Network Temporary Identifier (RNTI) according to the owner or usage of the PDCCH. If the PDCCH is for a specific UE, the CRC may be masked by a cell-RNTI (C-RNTI) of the UE. If the PDCCH is for a paging message, the CRC may be masked by a paging indicator identifier (P-RNTI). If the PDCCH is for system information (more specifically, a System Information Block (SIB)), the CRC may be masked by a system information identifier and a System Information RNTI (SI-RNTI). To indicate a random access response to a random access preamble received from the UE, the CRC may be masked by a random access-RNTI (RA-RNTI).

FIG. 5 is a diagram illustrating the structure of an uplink subframe. The uplink subframe may be divided into a control region and a data region in the frequency domain. A Physical Uplink Control Channel (PUCCH) including uplink control information is allocated to the control region. A Physical uplink Shared Channel (PUSCH) including user data is allocated to the data region. In order to maintain single carrier property, one UE does not simultaneously transmit the PUCCH and the PUSCH. A PUCCH for one UE is allocated to an RB pair in a subframe. The RBs of the RB pair occupy different subcarriers in two slots. Thus, the RB pair allocated to the PUCCH is "frequency-hopped" over a slot boundary.

Modeling of Multi-Antenna (MIMO) System

Hereinafter, a MIMO system will be described. MIMO (Multiple-Input Multiple-Output) is a scheme of using a plurality of transmit antennas and a plurality of receive antennas. With this scheme, efficiency of transmission and reception of data may be enhanced. That is, when the transmission entity or reception entity of the wireless communication system uses a plurality of antennas, transmission capacity and performance may be enhanced. In this specification, MIMO may be referred to as 'multi-antenna'.

In the multi-antenna technology, reception of one whole message does not depend on a single antenna path. Instead, data fragments received though several antennas are collected and merged into whole data. With the multi-antenna technology, system coverage may be expanded in a cell region of a specific size with a data transfer rate improved or a specific data transfer rate ensured. In addition, this technology may be widely used by, for example, a mobile communication terminal and a relay. In conventional cases, a single transmit antenna and a single receive antenna have been used. With the multi-antenna technology, limitation on the transfer rate in mobile communication based on the conventional technology using a single antenna may be overcome.

At the same time, data transmission efficiency may be improved. Among various technologies, the MIMO technology may greatly enhance communication capacity and transmission/reception performance without additional allocation of frequencies or additional increase of power. Due to this advantage, the MIMO technology is drawing attention from a majority of companies and developers.

FIG. 6 illustrates configuration of a wireless communication system having multiple antennas (MIMO).

As shown in FIG. 6, $N_T$ transmit (Tx) antennas are installed at the transmission entity, and $N_R$ receive (Rx) antennas are installed at the reception entity. If both the transmission entity and the reception entity use a plurality of antennas as illustrated in the figure, a greater theoretical channel transmission capacity is obtained than when only one of the transmission entity and the reception entity uses a plurality of antennas. The channel transmission capacity increases in proportion to the number of antennas. Accordingly, the transfer rate and the frequency efficiency are enhanced along with increase of the channel transmission capacity. When the maximum transfer rate obtained using one antenna is Ro, the transfer rate obtained using multiple antennas may theoretically increase by the maximum transfer rate Ro multiplied by the rate of rate increase Ri given by Equation 1 below. Herein, Ri is the smaller one of $N_T$ and $N_R$.

$$R_i = \min(N_T, N_R) \quad \text{[Equation 1]}$$

For example, a MIMO communication system that uses four Tx antennas and four Rx antennas may theoretically acquire four times the transfer rate acquired by a single antenna system. After the above-mentioned theoretical increase in capacity of the MIMO system was demonstrated in the mid-1990s, research has been actively conducted into a variety of technologies which may substantially increase data transfer rate, and some of the technologies have been reflected in a variety of wireless communication standards such as, for example, the third-generation mobile communication and the next-generation wireless LAN.

A variety of MIMO-associated technologies have been actively researched. For example, research into information theory related to MIMO communication capacity in various channel environments and multi-access environments, research into a radio frequency (RF) channel measurement and modeling of the MIMO system, and research into space-time signal processing technology have been actively conducted.

Hereinafter, mathematical modeling of a communication method for use in the MIMO system will be described in detail. As shown in FIG. 6, It is assumed that the system includes $N_T$ Tx antennas and $N_R$ Rx antennas In the case of a transmission signal, the maximum number of pieces of transmittable information is $N_T$ under the condition that $N_T$ Tx antennas are used, and thus the transmission information may be represented by a vector of Equation 2 given below.

$$s = [s_1, s_2, \ldots, s_{N_T}]^T \quad \text{[Equation 2]}$$

For the respective pieces of transmission information $s_1$, $s_2, \ldots, s_{N_T}$, different transmit powers may be used. In this case, when the respective transmit powers are denoted by $P_1$, $P_2, \ldots, P_{N_T}$, the pieces of transmission information having adjusted transmit powers may be expressed by Equation 3 below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

$\hat{S}$ may be expressed by Equation 4 below using a diagonal matrix P of transmit powers.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Suppose that a weight matrix W is applied to the information vector $\hat{S}$ having adjusted transmit powers, and thus $N_T$ transmitted signals $x_1, x_2, \ldots, x_{N_T}$ to be actually transmitted are configured. In this case, the weight matrix W serves to properly distribute transmission information to individual antennas according to the transmission channel situation. The transmitted signals x1, x2, . . . , xNT may be represented by Equation 5 below using vector X $$x = \begin{bmatrix} x_1 \\ x_2 \\ \vdots \\ x_i \\ \vdots \\ x_{N_T} \end{bmatrix} =$$ [Equation 5]

$$\begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

Here, $W_{ij}$ denotes a weight corresponding to the i-th Tx antenna and the j-th information. W is called a weight matrix or a precoding matrix.

This method may be viewed in a different way in terms of the type of the MIMO technology. If one stream is transmitted via several antennas, the method may be viewed as a space diversity scheme. In this case, the elements of the information vector $\hat{S}$ have the same value. If multiple streams are transmitted via multiple antennas, the method may be viewed as a spatial multiplexing scheme. In this case, the elements of the information vector $\hat{S}$ have different values. Of course, a hybrid method that combines space diversity spatial multiplexing is also possible. That is, one signal is transmitted via three transmit antennas according to the space diversity scheme, and the other signals are transmitted according to the spatial multiplexing scheme.

When NR Rx antennas are used, received signals y1, y2, . . . , yNR of individual antennas may be expressed by a vector of the following equation.

$$y = [y_1, y_2, \ldots, y_{N_R}]^T$$ [Equation 6]

When channel modeling is performed in the MIMO wireless communication system, individual channels may be distinguished from each other by Tx/Rx antenna indexes. Suppose that a channel running from a Tx antenna j to an Rx antenna i is denoted by $h_{ij}$. In denoting indexes for $h_{ij}$, it should be noted that, an Rx antenna index comes first and the Tx antenna index comes later.

FIG. 6(b) shows channels from $N_T$ Tx antennas to Rx antenna i. The channels may be grouped and expressed in the form of a vector or matrix. In FIG. 6(b), the channels reaching the Rx antenna i from the $N_T$ Tx antennas may be represented by the following equation.

$$h_i^T = [h_{i1}, h_{i2}, \ldots, h_{iN_T}]$$ [Equation 7]

All channels reaching $N_R$ Rx antennas from the $N_T$ Tx antennas may be expressed by the following.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix}$$ [Equation 8]

In reality, additive white Gaussian noises (AWGNs) are added to the channels after application of channel matrix H. The AWGNs $n_1, n_2, \ldots, n_{N_R}$ added to $N_R$ Rx antennas may be expressed by the following equation.

$$n = [n_1, n_2, \ldots, n_{N_R}]^T$$ [Equation 9]

Received signals according to the mathematical modeling described above may be expressed by the following equation.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Equation 10]

$$Hx + n$$

The number of rows and columns of channel matrix H indicating a channel condition is determined by the number of Tx/Rx antennas. In the channel matrix H, the number of rows is equal to the number of Rx antennas $N_R$, and the number of columns is equal to the number of Tx antennas $N_T$. That is, the channel matrix H is an $N_R \times N_T$ matrix.

A rank of a matrix is defined as the smaller one of the number of independent rows and the number of independent columns of the matrix. Therefore, the matrix rank may not be higher than the number of rows or columns. The rank of channel matrix H may be restricted as expressed by the following equation.

$$\text{rank}(H) \leq \min(N_T, N_R)$$ [Equation 11]

The rank may be defined as the number of non-zero Eigen values obtained when Eigen value decomposition is performed on the matrix. Similarly, the rank may be defined as the number of non-zero singular values obtained when singular value decomposition is performed on the matrix. Accordingly, the rank of a channel matrix physically means the maximum number of pieces of information that is transmittable over a given channel.

Measurement by UE

In some cases, a UE needs to perform downlink measurement. For example, in order for a BS to support a handover operation of the UE or an inter-cell interference coordination, the UE needs to perform DL measurement and to report a result of the DL measurement to the BS. The DL measurement involves various measurement schemes such as, for example, measurement for Radio Link Monitoring (RLM), measurement for channel state information (CSI)

reporting and radio resource management (RRM) measurement and various measurement values.

The RLM measurement may include, for example, DL measurement that is used in the process of detecting radio link failure (RLF) and discovering a new radio link. The measurement for the CSI reporting may include, for example, measurement of a downlink channel quality performed by the UE to select/calculate and report an appropriate rank indicator, an appropriate precoding matrix indicator and an appropriate channel quality indicator. The RRM measurement may include, for example, measurement for determining presence or absence of handover of the UE.

The RRM measurement may include measurements of Reference Signal Received Power (RSRP), Reference Signal Received Quality (RSRQ), Received Signal Strength Indicator (RSSI) and the like.

RSRP is defined as a linear average of powers of a resource element that carries a cell-specific RS (CRS) in a measured frequency bandwidth. A UE may determine RSRP by detecting a CRS transmitted by being mapped onto a specific resource element. For RSRP calculation, a CRS (R0) for an antenna port 0 may be basically used. If the UE is capable of reliably detecting a CRS (R1) for an antenna port 1, RSRP may be determined using R1 in addition to R0. For details of the cell-specific RS, the standard document (e.g., 3GPP TS36.211) and a description give below with reference to FIG. 7 may be referenced.

RSRQ is defined as a value obtained by dividing a value obtained by multiplying the RSRP by the number N of resource blocks in a measured frequency bandwidth by 'E-UTRA carrier RSSI' (i.e., RSRQ=N×RSRP/(E-UTRA carrier RSSI)). The numerator (N×RSRP) and the denominator (E-UTRA carrier RSSI) are measured for the same resource block set.

The 'E-UTRA carrier RSSI' includes a linear average of total reception power measured on signals received from all sources including common-channel serving and non-serving cells, neighboring channel interference and thermal noise, by a UE for only OFDM symbols including a reference symbol for antenna port 0 (i.e., CRS for antenna port 0) over N resource blocks in a measurement bandwidth.

'UTRA FDD carrier RSSI' is defined as a received wideband power including noise generated from a receiver and thermal noise in a bandwidth defined by a receiver pulse forming filter.

'UTRA TDD carrier RSSI' is defined as a received wideband power including noise generated from a receiver and thermal noise in a bandwidth defined by a receiver pulse forming filter within a specific time slot.

The standard document (e.g., 3GPP TS36.214) may be referenced for the description of the DL channel measurement other than the description given above, and detailed description of the DL channel measurement shall be omitted for clarity. Yet, it is apparent that the details of the DL channel measurement disclosed in the standard are applicable to DL channel measurements employed in various embodiments of the present invention described below.

Reference Signal; RS

Hereinafter, a reference signal (RS) will be described.

In a wireless communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

Recently, in most mobile communication systems, when packets are transmitted, a method for improving data transmission/reception efficiency using multiple transmission antennas and multiple reception antennas has been used, unlike the related art using one transmission antenna and one reception antenna. In the case in which the transmitter or the receiver uses multiple antennas so as to increase capacity or improve performance, in order to accurately receive the signal, the channel statuses between the transmission antennas and the reception antennas should be acquired from the respective RSs of the transmission antennas.

In a wireless communication system, RSs may be largely divided into two RSs according to their purposes: a RS for acquiring channel information and an RS used for data demodulation. The former is used for enabling a User Equipment (UE) to acquire downlink channel information, and thus should be transmitted in a wideband. Accordingly, even a UE which does not downlink data in a specific subframe should receive this RS and perform channel measurement. In addition, this RS is also used for measurement for mobility management such as handover or the like.

The latter is an RS which is sent together when a base station (eNB) sends downlink data. The UE may receive this RS so as to perform channel estimation and demodulate the data. This RS should be transmitted in a region in which data is transmitted.

In an LTE system, two downlink RSs are defined for a unicast service. More specifically, there are a common RS (CRS) for measurement associated with handover and channel status information acquisition and a dedicated RS (DRS) used for data demodulation. The CRS may be referred to as a cell-specific RS and the DRS may be referred to as a UE-specific RS.

In an LTE system, the DRS is used only for data demodulation and the CRS is used for channel information acquisition and data demodulation.

The reception side (a UE) may estimate a channel state from CRS and feed back a channel quality-related indicator such as a CQI (Channel Quality Indicator), a PMI (Precoding Matrix Index) and/or an RI (Rank Indicator) to the transmission side (an eNB). Alternatively, an RS related to feedback of channel state information (CSI) such as CQI/PMI/RI may be separately defined as the CSI-RS. The CRS may also be referred to as a cell-specific reference signal. The CRS is transmitted in every subframe over a wideband as a cell-specific reference signal. In addition, the CRS is transmitted based on up to four antenna ports according to the number of Tx antennas of the eNB.

Meanwhile, when demodulation of data on PDSCH is needed, the DRS may be transmitted through a corresponding RE. The UE may receive, from a higher layer, an indication signaling presence or absence of a DRS, and also receive, only if the PDSCH is mapped, an indication signaling that the DRS is valid. The DRS may be referred to as a UE-specific reference signal or a demodulation reference signal (DMRS).

FIG. 7 is a diagram illustrating a pattern of mapping of a CRS and a DRS defined in the legacy 3GPP LTE system (e.g., Release-8) to resource block (RB) pairs. A downlink RB pair, as a unit to which an RS is mapped, may be expressed in a unit of one subframe in the time domain×12 subcarriers in the frequency domain. That is, the length of one RB pair is 14 OFDM symbols for a normal CP (FIG. 7(a)) and 12 OFDM symbols for an extended CP (FIG. 7(b)).

FIG. 7 shows locations of RSs on RB pairs in a system in which the BS supports four transmit antennas. In FIG. 7, resource elements (REs) indicated by "0", "1", "2" and "3" represent the locations of the CRSs for antenna port indexes 0, 1, 2 and 3, respectively. In FIG. 7, REs indicated by "D" represent the locations of the DMRSs.

Hereinafter, CRS will be described in detail.

A CRS is used to estimate a channel of a physical antenna end, and is distributed over the entire band as a reference signal which may be received by all UEs in a cell in common. The CRS may be used for the purpose of acquisition of CSI and data demodulation.

The CRS is defined in various forms according to configuration of antennas on the transmission side (the eNB). The 3GPP LTE (e.g., Release-8) system supports various antenna configurations, and a downlink signal transmission side (the eNB) has three types of antenna configurations including single antenna, 2 Tx antennas and 4 Tx antennas. If the eNB transmits performs single antenna transmission, a reference signal for a single antenna port is deployed. If the eNB performs 2-antenna transmission, reference signals for two antenna ports are deployed according to a time division multiplexing scheme and/or a frequency division multiplexing scheme. That is, the reference signals for two antenna ports may be distinguished from each other by being disposed on different time resources and/or different frequency resources. If the eNB performs 4-antenna transmission, reference signals for four antenna ports are deployed according to the TDM/FDM scheme. Channel information estimated by a downlink signal reception side (a UE) through the CRS maybe used for demodulation of data transmitted using transmission techniques such as single antenna transmission, transmit diversity), closed-loop spatial multiplexing, open-loop spatial multiplexing, and multi-user MIMO (MU-MIMO).

If multiple antennas are supported, a reference signal is transmitted through a certain antenna port on the position of an RE designated according to an RS pattern, and no signal is transmitted on the position of an RE designated for other antenna ports.

The rule by which the CRS is mapped on to RBs is expressed by Equation 12 given below.

$$k = 6m + (v + v_{shift}) \mod 6 \quad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \mod 2) & \text{if } p = 2 \\ 3 + 3(n_s \mod 2) & \text{if } p = 3 \end{cases}$$

$$v_{shift} = N_{ID}^{cell} \mod 6$$

In Equation 12, k is a subcarrier index, l is a symbol index, and p is an antenna port index. $N_{symb}^{DL}$ denotes the number of OFDM symbols of one downlink slot, $N_{RB}^{DL}$ denotes the number of RBs allocated to downlink, n, denotes a slot index, and $N_{ID}^{cell}$ denotes a cell ID. 'mod' denotes modulo operation. The location of a reference signal in the frequency domain depends on the value of $V_{shift}$. Since $V_{shift}$ depends on the cell ID, the location of the reference signal has different frequency shift values for respective cells.

Specifically, in order to improve performance of channel estimation through the CRS, the location of the CRS in the frequency domain may be differently set for respective cells by shifting the location of the CRS. For example, reference signals are positioned every 3 subcarriers, one cell may be disposed on subcarrier 3k, and another cell may be disposed on subcarrier 3k+1. A reference signal for one antenna port is disposed at intervals of 6 REs (i.e., 6 subcarriers) in the frequency domain, and is kept spaced from a reference signal for another antenna port by 3 REs in the frequency domain.

Additionally, power boosting may be applied to the CRS. Power boosting means transmitting a reference signal using high power of an RE other than the RE allocated to the reference signal among REs of one OFDM symbol.

In the time domain, reference signals are disposed at constant intervals, starting from symbol index (1) 0 of each slot. The time interval is differently defined according to the CP length. For normal CP, reference signals are positioned on symbol indexes 0 and 4 of a slot. For extended CP, reference signals are positioned on symbol indexes 0 and 3 of the slot. a reference signal for up to two antenna ports is defined on each OFDM symbol. Accordingly, in the case of 4-Tx antenna transmission, reference signals for antenna ports 0 and 1 are positioned on symbol indexes 0 and 4 of a slot (symbol indexes 0 and 3 for the extended CP), and reference signals for antenna ports 2 and 3 are positioned on symbol index 1 of the slot. The locations of the reference signals for antenna ports 2 and 3 in the frequency domain are switched in the second slot.

In order to support spectral efficiency higher than that of the legacy 3GPP LTE (e.g., Release-8) system, a system having an extended antenna configuration (e.g., LTE-A system) may be designed. The extended antenna configuration may be, for example, 8-Tx antenna configuration. In a system having such extended antenna, it is necessary to support UEs operating in the conventional antenna configuration, namely to support backward compatibility. Accordingly, a reference signal pattern according to the conventional antenna configuration needs to be supported and a new reference signal pattern for an additional antenna configuration needs to be designed. Herein, if a CRS for a new antenna port is added to a system having the conventional antenna configuration, reference signal overhead drastically increases, thereby lowering the data transfer rate. In consideration of this matter, a separate reference signal for CSI measurement (CSI-RS) for a new antenna port may be introduced in the LTE-A (Advanced) system, which is an evolution of 3GPP LTE. The CSI-RS, which a separate reference signal will be described later.

Hereinafter, a detailed description will be given of DRS.

A DRS (or UE-specific reference signal) is a reference signal used for data demodulation. A precoding weight used for a specific UE in performing antenna transmission may be applied to the reference signal. Thereby, once the UE receives the reference signal, the UE may estimate an equivalent channel which is a combination of the precoding weight transmitted through each transmit antenna with a transmission channel.

In the legacy 3GPP LTE system (e.g., Release-8), transmission through up to 4 Tx antennas is supported, and a DRS for rank 1 beamforming is defined. The DRS for rank 1 beamforming may be indicated by a reference signal for antenna port index 5. A rule by which the DRS is mapped onto RBs complies with Equations 13 and 14 given below. Equation 13 is applied to normal CP, and Equation 14 is applied to extended CP.

$$k = (k') \bmod N_{sc}^{RB} + N_{sc}^{RB} \cdot n_{PRB} \quad \text{[Equation 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equation 13 and 14, k is a subcarrier index, l is a symbol index, and p is an antenna port index. $N_{SC}^{RB}$, which represents the RB size in the frequency domain, is the number of subcarriers. $n_{PRB}$ denotes a physical RB number. $N_{RB}^{PDSCH}$ denotes a bandwidth of an RB for corresponding PDSCH transmission. $n_s$ denotes a slot index, and $N_{ID}^{cell}$ denotes a cell ID. 'mod' denotes modulo operation. In the frequency domain, the location of a reference signal depends on the value of Vshift. Since Vshift depends on the cell ID, the location of the reference signal has different frequency shift values for respective cells.

In the LTE-A (Advanced) system, which is the evolution of 3GPP LTE, high-order MIMO, multi-cell transmission, and advanced MU-MIMO are taken into consideration. In order to support efficient management of the reference signal and an advanced transmission scheme, DRS-based data demodulation is taken into consideration. That is, separately from the DRS (antenna port index 5) for rank 1 beamforming defined in legacy 3GPP LTE (e.g., Release-8), a DRS for two or more layers may be defied to support data transmission through an added antenna.

Meanwhile, as described above, in an LTE system the CRS is transmitted based on a maximum of four antenna ports according to the number of transmission antennas. For example, if the number of transmission antennas of a base station is two, CRSs for antenna ports 0 and 1 are transmitted and, if the number of transmission antennas is four, CRSs for antenna ports 0 to 3 are transmitted.

Figure 8:
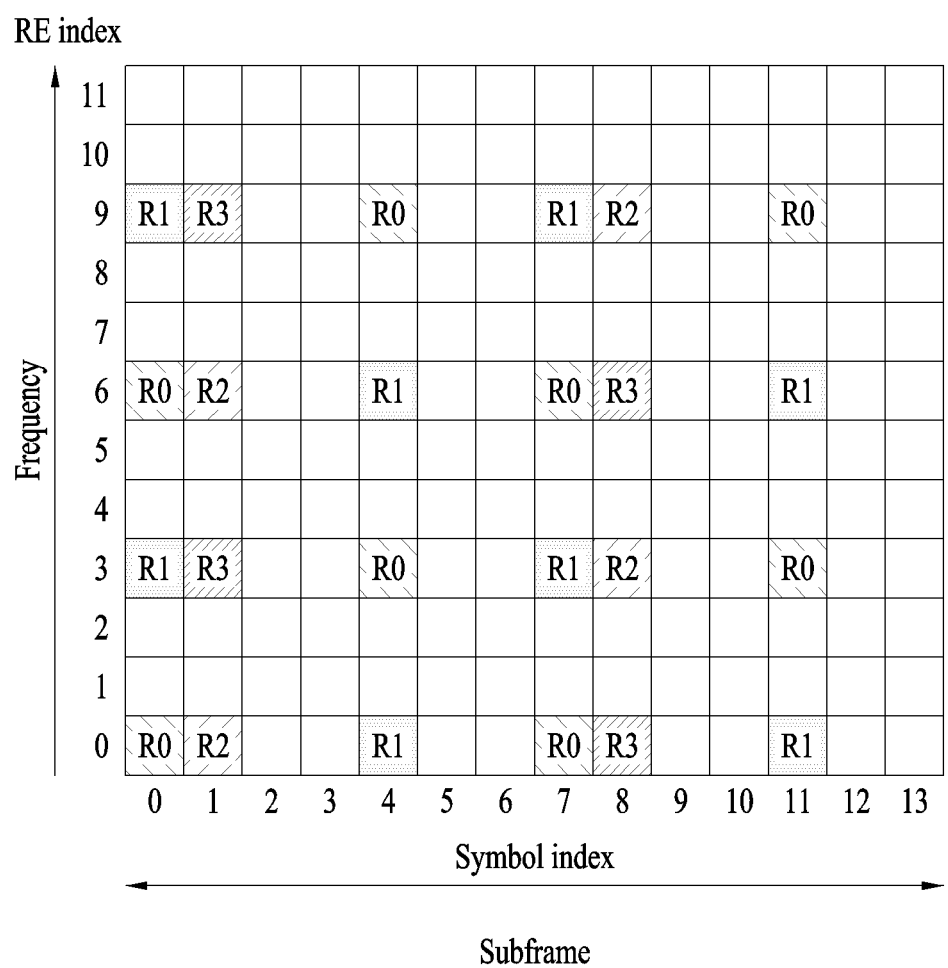
FIG. 8 is a diagram for one example of a general CRS pattern in case of 4 transmitting antenna ports in an LTE system.

FIG. 8 is a diagram showing a general CRS pattern in the case in which the number of transmission antenna ports is 4 in an LTE system.

Referring to FIG. 8, if CRSs are mapped to time-frequency resources in the LTE system, an RS for one antenna port on a frequency axis is transmitted in a state of being mapped to one RE among 6 REs. Since one RB includes 12 REs on the frequency axis, two REs of one RB are used as REs for one antenna port.

In an LTE-A system, an evolved form of the LTE system, a base station (eNB) should be designed to support a maximum of eight transmission antennas in downlink. Accordingly, RS transmission for a maximum of eight transmission antennas should also be supported.

More specifically, since only RSs for a maximum of four antenna ports are defined as downlink RSs in the LTE system, if an eNB has four to eight downlink transmission antennas in the LTE-A system, RSs for these antennas should be additionally defined. RSs for channel measurement and RSs for data demodulation should be designed as the RSs for a maximum of eight transmission antenna ports.

One important consideration in design of the LTE-A system is backward compatibility. That is, an LTE UE should operate well even in the LTE-A system and the LTE-A system should support the LTE UE. In terms of RS transmission, in a time-frequency domain in which CRSs defined in the LTE system are transmitted, RSs for a maximum of eight transmission antenna ports should be additionally defined. However, in the LTE-A system, if an RS pattern for a maximum of eight transmission antennas is added to the entire band per subframe using the same method as the CRS of the conventional LTE system, overhead is excessively increased.

Accordingly, RSs newly designed in the LTE-A system are roughly divided into two types: a channel measurement RS (Channel Status Information-RS (CSI-RS)) for selecting an MCS, a Precoding Matrix Indicator (PMI) or the like and a Demodulation RS (DM-RS) for demodulation of data transmitted via eight transmission antennas.

The CSI-RS is used only for channel measurement, whereas the existing CRS is used for channel measurement, handover measurement or data demodulation. Since the CSI-RS is transmitted to acquire channel status information, the CSI-RS may not be transmitted per subframe, unlike the CRS. Currently, in the LTE-A standard, CSI-RSs may be allocated to antenna ports 15 to 22 and CSI-RS setting information is defined to be received through higher layer signaling.

In addition, for data demodulation, a DM-RS is transmitted to a UE scheduled in a corresponding time-frequency domain as a DRS. That is, the DM-RS transmitted to a specific UE is transmitted only in a domain scheduled to the UE, that is, in a time-frequency domain in which the UE receives data.

In the LTE-A system supporting up to eight downlink Tx antennas, an eNB should transmit CSI-RSs for all the antenna ports, as described before. Because transmission of CSI-RSs for up to eight Tx antenna ports in every subframe leads to too much overhead, the CSI-RSs should be transmitted intermittently along the time axis to thereby reduce CSI-RS overhead. Therefore, the CSI-RSs may be transmitted periodically at every integer multiple of one subframe, or in a predetermined transmission pattern.

The CSI-RS transmission period or pattern of the CSI-RSs may be configured by the eNB. To measure the CSI-RSs, a UE should have knowledge of a CSI-RS configuration that has been set for CSI-RS antenna ports in its serving cell. The CSI-RS configuration may specify the index of a downlink subframe carrying CSI-RSs, the time-frequency positions of CSI-RS REs in the downlink subframe, a CSI-RS sequence (a sequence used for CSI-RSs, generated pseudo-randomly based on a slot number, a cell ID, a CP length, etc. according to a predetermined rule), etc. That is, a given eNB may use a plurality of CSI-RS configurations and may indicate a CSI-RS configuration selected for use from among the plurality of CSI-RS configurations to a UE(UEs) in its cell.

To identify a CSI-RS for each antenna port, resources carrying the CSI-RS for the antenna port should be orthogonal to resources carrying CSI-RSs for other antenna ports. As described before with reference to FIG. 8, CSI-RSs for different antenna ports may be multiplexed in FDM using orthogonal frequency resources, in TDM using orthogonal time resources, and/or in CDM using orthogonal code resources.

When notifying UEs within the cell of CSI-RS information (i.e. a CSI-RS configuration), the eNB should first transmit to the UEs information about time-frequency resources (time information and frequency information) to which a CSI-RS for each antenna port is mapped. To be more specific, the time information may include the number of a subframe carrying CSI-RSs, a CSI-RS transmission period, a CSI-RS transmission subframe offset, and the number of an OFDM symbol carrying CSI-RS REs for an antenna. The frequency information may include a frequency spacing between CSI-RS REs for an antenna and a CSI-RS RE offset or shift value along the frequency axis.

Meanwhile, in case of switching to an unlicensed band use or a UE-to-UE direct communication, limitations may be put on using some of resources. A signal transceiving method for easing such limitations according to the present invention is described as follows. For clarity of the following description, assume a case of a UE-to-UE (or, D2D) direct communication.

Figure 9:
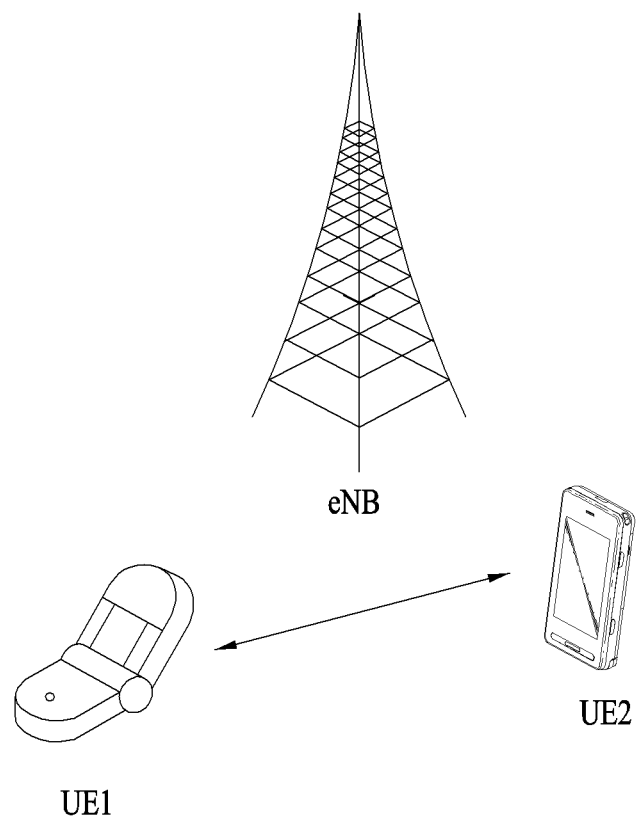
FIG. 9 is a diagram for the concept of UE-to-UE direct communication.

FIG. 9 is a diagram for the concept of UE-to-UE direct communication.

Referring to FIG. 9, UE 1 and UE 2 are mutually performing a UE-to-UE direct communication. In this case, 'UE' means a user equipment of a user. Yet, although such a network equipment as a base station transceiver signals by a UE-to-UE communication system, it can be regarded as a sort of UE. Meanwhile, an eNB can control locations of time/frequency resources, transmission power and the like for a direct communication between UEs using appropriate control signals. Yet, in case that UEs are located outside a coverage of the eNB, the direct communication between the UEs may be set to be performed without control signals of the eNB. In the following description, UE-to-UE direct communication shall be named D2D (device-to-device) communication. And, a link established for the D2D communication shall be named D2D (device-to-device) link. Moreover, a link for a UE to communicate with an eNB shall be named eNB-UE link.

Meanwhile, while a UE performs a communication with another UE within a coverage through a D2D link, the UE should perform a communication with a prescribed UE existing at a location incapable of connection through a D2D link (i.e., a prescribed UE outside the coverage). In doing so, the communication with the UE outside the coverage is performed through an eNB-UE link. In particular, a wireless communication should be operated in a manner that a D2D link and an eNB-UE link can coexist in viewpoint of a specific UE.

Generally, a wireless communication system has use resources of two types. In particular, the two types may include a downlink (DL) resource used by an eNB for a transmission to a UE and an uplink (UL) resource used by an UE for a transmission to an eNB. In an FDD system, a DL resource corresponds to a DL band and a UL resource corresponds to a UL band. In a TDD system, a DL resource corresponds to a DL subframe and a UL resource corresponds to a UL subframe. Generally, since a DL resource is a resource for an eNB to transmit a signal with high transmission power, an interference level is very high for a UE with a relatively low power to operate a D2D link. Hence, it is preferable that a UL resource is utilized for a D2D link.

Meanwhile, a UL resource is configured with a plurality of UL subframes. A UE synchronized by being connected to an eNB can obtain a boundary of a UL subframe by receiving a timing advance (TA) indication designated by the eNB from the eNB.

Figure 10:
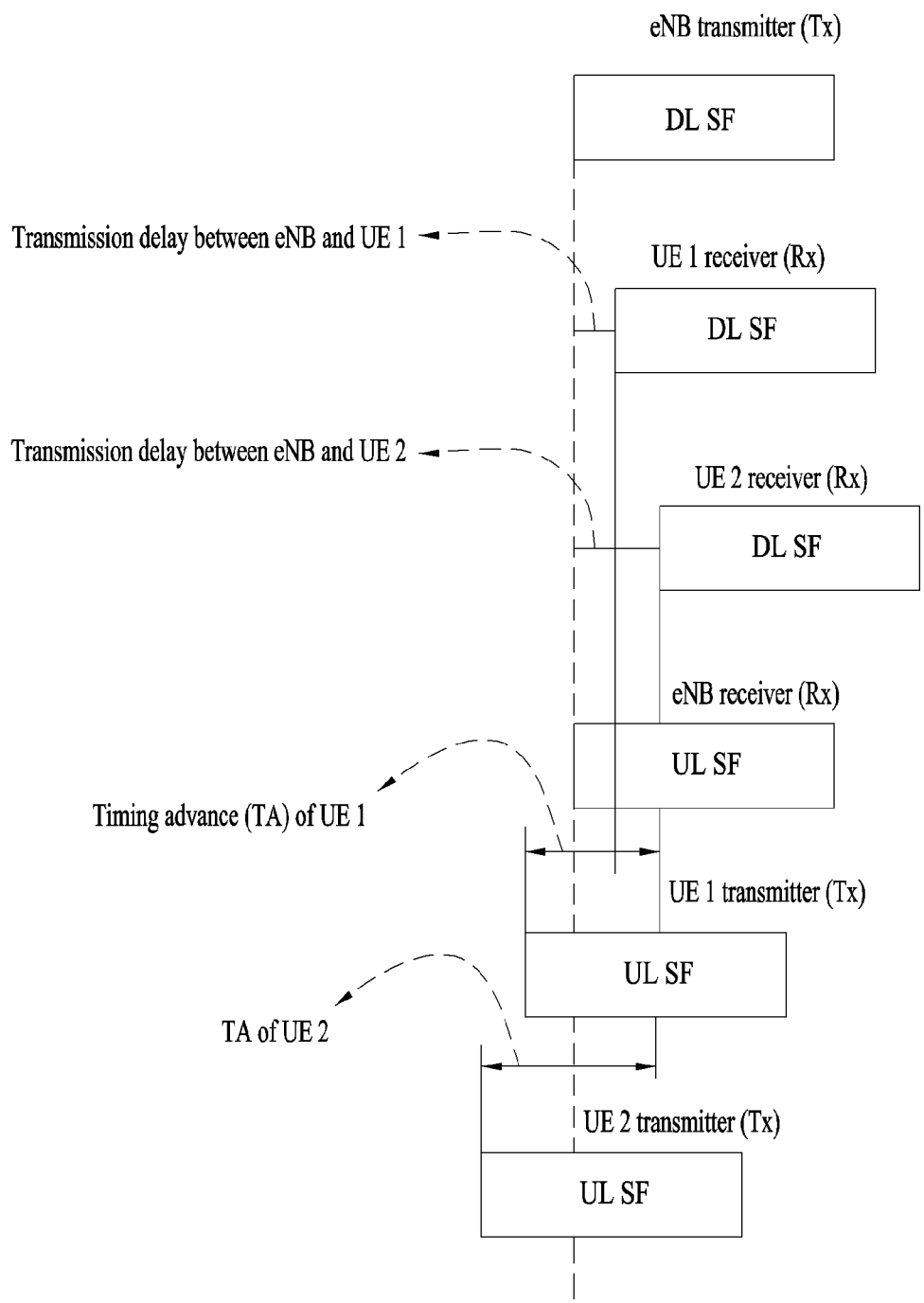
FIG. 10 is a diagram to describe a method for a user equipment to obtain a boundary of an uplink subframe.

FIG. 10 is a diagram to describe a method for a user equipment to obtain a boundary of an uplink subframe.

A plurality of UEs may be located in different distances from an eNB. And, the eNB can transmit a TA indication to each of the UEs so that signals transmitted by a plurality of the UEs to arrive at a base station at the same timing point. In particular, the eNB can instruct each of the UEs to set a boundary of a UL subframe to be advanced by a prescribed time from a timing point of detecting a boundary of a DL subframe. As the eNB sets a TA to an appropriate value, the eNB can receive signals from a plurality of the UEs at the same time. For instance, the eNB can set the TA to a double of a propagation delay between the corresponding UE and the eNB. If so, since it is able to compensate for the propagation delay between the eNB and each of the UEs, the eNB can receive the signals from the UEs simultaneously. For instance, if a value of a propagation delay of the UE 1 shown in FIG. 8 is 1, the eNB can set the TA to 2. For another instance, if a value of a propagation delay of the UE 2 is 2, the eNB can set the TA for the UE 2 to 4. In this case, the eNB can receive signals from the UE1 and the UE 2 at the same time. As mentioned in the foregoing description, using the TA indication, each of the UEs can obtain the boundary of the UL subframe of the eNB-UE link.

Meanwhile, it may happen that a UE failing to be connected to an ENB should perform a D2D operation as well. The UE failing to be connected to the eNB is unable to receive a TA indication from the eNB. In the following description, a method for a UE, which fails to be connected to an eNB, to set a subframe boundary for a D2D link is explained.

First of all, a UE failing to be connected to an eNB can set a subframe boundary based on a TA indication obtained from such a procedure as a random access before performing a D2D operation. Yet, such a method may accompanied by additional time delay and battery consumption. Hence, the UE failing to be connected to the eNB may operate to set a subframe boundary without the TA indication. In this case, 'operating without the TA indication' may mean that a TA value specified to a specific UE is not provided. This may mean that a multitude of unspecific UEs operate with the same TA value. In particular, as a TA value is set to 0, it may mean that a boundary of a DL subframe received by a UE becomes a boundary of a UL subframe (or, D2D subframe). Alternatively, it may mean that a TA value is set to a specific TA value determined in advance through system information or the like.

Meanwhile, D2D communication may be mainly divided into two procedures. One is a discovery procedure for obtaining an existence of a UE existing at an adjacent location, while the other is a communication procedure for transceiving data with a specific UE. In case that a D2D communication is performed without TA indication, both of the procedures may be performed for the D2D communication without the TA indication. Alternatively, one of the two procedures may be performed for the D2D communication without the TA indication.

For instance, a UE failing to be connected to an eNB performs a discovery procedure without TA indication. Yet, if a counterpart UE is discovered through the discovery procedure, the UE failing to be connected to the eNB attempts a connection to the eNB and is then able to perform a communication operation by obtaining the TA indication. In doing so, a UE having already obtained TA by being connected to the eNB may operate on the assumption that there is no TA. In particular, for the synchronization with the UE failing to be connected to the eNB, the eNB connected UE having already obtained the TA can perform a specific procedure of the D2D process or the whole D2D process on the assumption that there is no obtained TA indication.

Particularly, in case that a UE connected to an eNB performs a D2D communication in accordance with a TA indication, a synchronization of a UL subframe with the D2D communication is maintained identically in eNB-UE link. Hence, influence of the D2D communication on the eNB-UE link can be minimized. In particular, if a specific subframe is used for a D2D communication, an adjacent subframe maintaining the same boundary of the specific subframe can be utilized as eNB-UE link.

Meanwhile, for a D2D communication, a UE should perform a signal transmitting operation and a signal receiving operation in UL resource. Generally, while a user equipment performs a transmitting operation, if the user switches the transmitting operation to a receiving operation, it consumes a predetermined time for the circuit stabilization. Hence, there exists a time region in which any communication is impossible. On the other hand, if the receiving operation is switched to the transmitting operation, there also exists a time region in which any communication is impossible. In the following description, a communication impossible region due to an operation switching shall be named a guard interval. A length of the guard interval normally amounts to about 1~100 μs.

Figure 11:
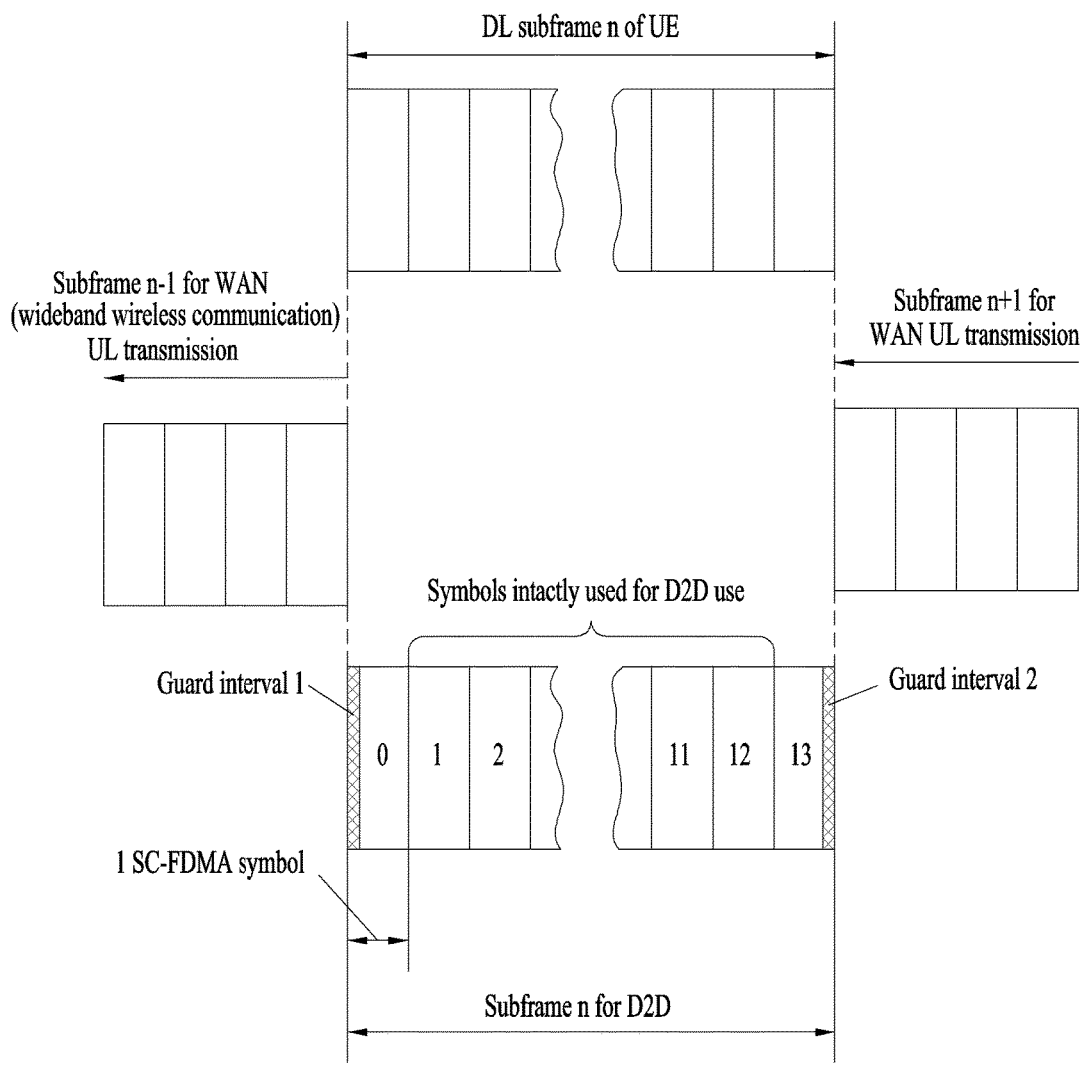
FIG. 11 is a diagram for one example of a subframe for performing a D2D operation according to an embodiment of the present invention.

FIG. 11 is a diagram for one example of a subframe for performing a D2D operation according to an embodiment of the present invention.

In FIG. 11, assuming a case of a normal CP of LTE, 14 symbols exist per subframe and a length of a single symbol is 1000/14 μs amounting to about 71 μs.

Particularly, assuming that TA is not used in the case shown in FIG. 11, a TA value of 0 is regarded as applied to a corresponding UE. According to the foregoing description, the discovery procedure corresponds to this. Referring to FIG. 11, a subframe n is assigned for a D2D communication and a D2D operation (communication) is performed with the same subframe boundary and symbol timing of a DL subframe. Moreover, in this case, since guard intervals exist in symbol #0 and symbol #13, respectively, it is impossible to use all the corresponding symbols. Hence, symbols intactly available for the subframe n are limited to 12 symbols.

Meanwhile, some or all of guard intervals shown in FIG. 11 may not appear in a UE that transmits a D2D signal. The reason for this is described as follows. First of all, since a transmitting UE transiting a D2D signal transmits a WAN (wide area networks) UL signal to an eNB in a subframe before or after a D2D subframe, a separate transmitting-receiving operation switching is unnecessary. Hence, the transmitting UEs may be transmitting specific signals in the guard intervals. This means that the receiving UE is unable to receive some signals included in the guard interval among the signals transmitted by the transmitting UE in viewpoint of the receiving UE.

In order to ease the limitations or restrictions mentioned in the foregoing description, the present invention proposes methods in the following.

Method 1: Adjustment of Start Timing Point of Subframe

In the following description, a method of increasing the number of available symbols by adjusting a start timing point of a D2D subframe is explained. In this case, if a specific symbol is usable for D2D, it may mean that a D2D transmitting UE can use the corresponding symbol for a D2D signal transmission or that a D2D receiving UE can use the corresponding symbol for a D2D signal reception.

Figure 12:
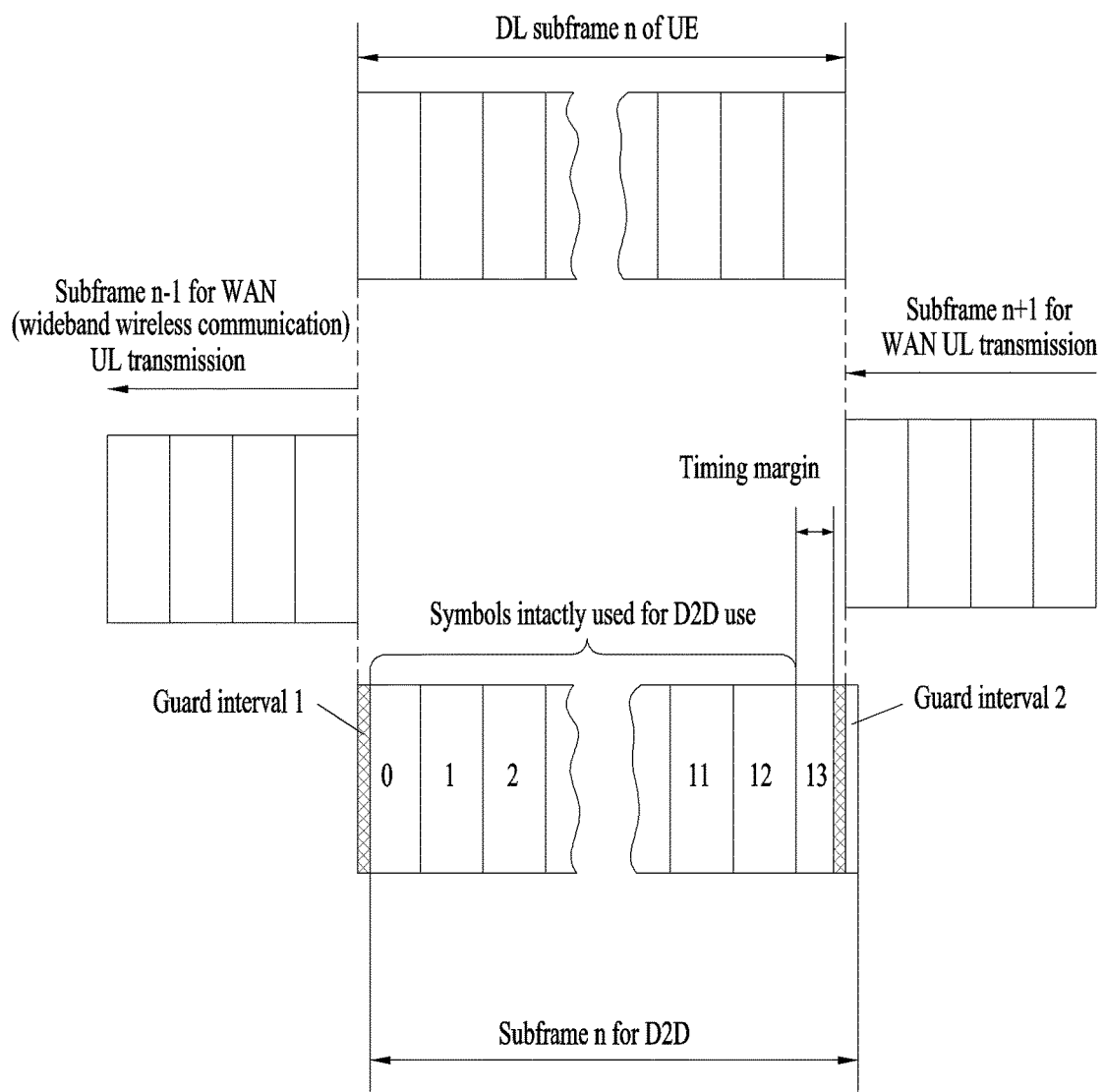
FIG. 12 and FIG. 13 are diagrams to describe a start timing point of a D2D operation according to an embodiment of the present invention.
Figure 13:
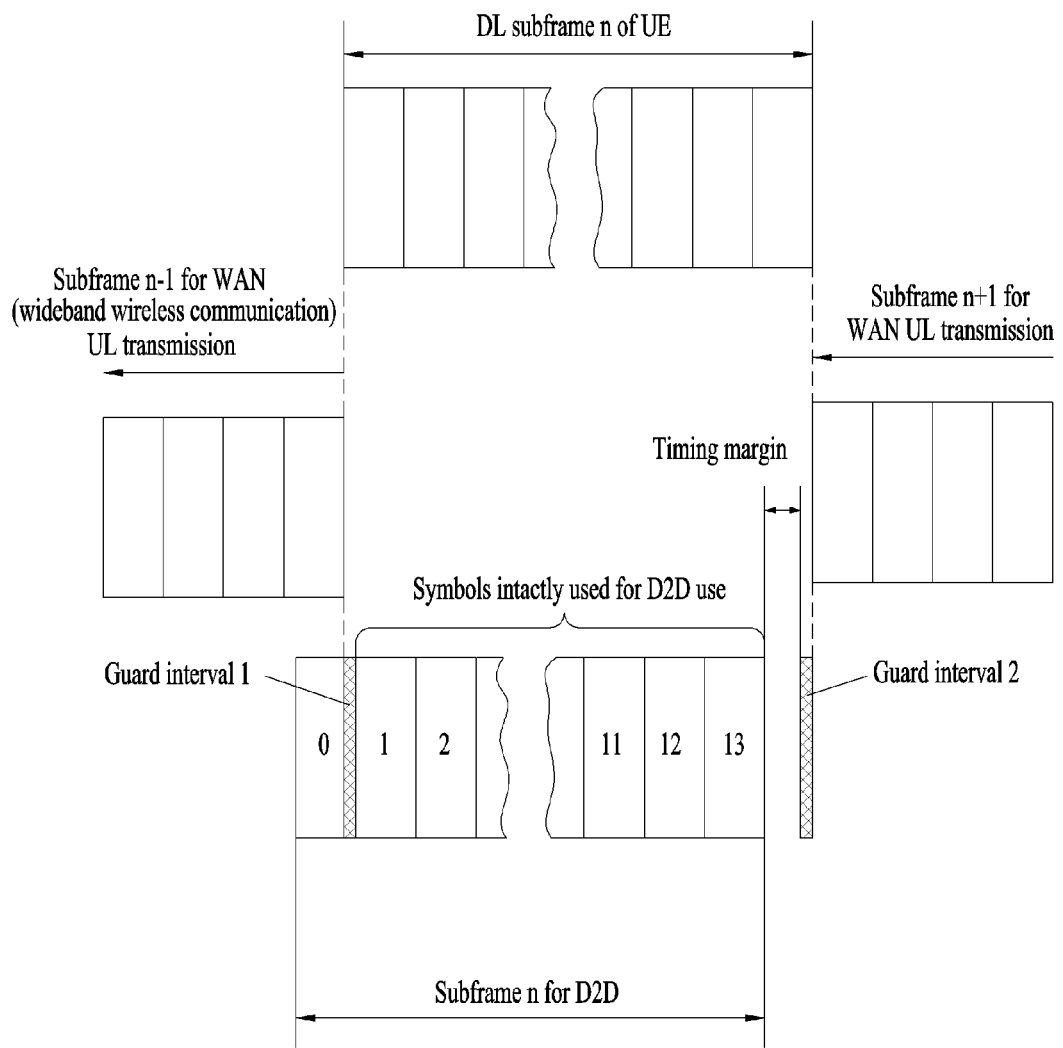

FIG. 12 and FIG. 13 are diagrams to describe a start timing point of a D2D operation according to an embodiment of the present invention.

Referring to FIG. 12 and FIG. 13, a UE can adjust a boundary of a D2D subframe to be spaced apart from a boundary of a DL subframe by a predetermined interval. In FIG. 12, a start timing point of the D2D subframe is shifted to a timing point of ending a guard interval 1 to use symbol #0. In this case, a time taken for the start timing point of the D2D subframe to be shifted is smaller than a single symbol duration. As a result, a symbol timing of the D2D subframe is different from that of an existing DL subframe or a UL subframe. If the same principle applies, referring to FIG. 13, it is able to implement symbol #13 to be used by shifting a timing point of starting symbol #1 of the D2D subframe to a timing point of ending the guard interval 1.

In case that the operation shown in FIG. 12 or FIG. 13 is performed, if a TA applied to a corresponding UE is small, the corresponding UE can use the reset of symbols (i.e., 13 symbols) except one symbol. Yet, if the TA applied to the corresponding UE increases, as a start timing point of a subframe n+1 is shifted forward, the number of available symbols decreases. Only if a TA equal to or smaller than a timing margin shown in FIG. 12 or FIG. 13 is applied, it is able to use 13 symbols. If the applied TA exceeds the timing margin, it is able to use 12 symbols. In this case, the timing margin is a value amounting to {(1 symbol duration)−(sum of lengths of 2 guard intervals)}.

Assuming that a length of each guard interval in LTE system that uses a normal CP is 20 μs, a timing margin amounts to about 31 μs (=71−20−20). TA of 31 μs corresponds to a round trip delay time taken for a distance (about 4.6 km) between an eNB and a UE. Hence, in case of a normal CP, a UE can operate on the assumption that the rest of symbols except 1 symbol can be always available in a cell of which radius is equal to or smaller than 31 μs. On the other hand, in case of an extended CP having 12 symbols exist in a single subframe, a timing margin becomes about 43 μs (=83−20−20) that corresponds to a round trip delay time amounting to 6.45 km. Hence, in case of an extended CP, a UE can operate on the assumption that the rest of symbols except 1 symbol can be always available in a cell of which radius is equal to or smaller than 43 μs.

In case that a TA equal to or smaller than a timing margin is applied, a UE performs a D2D operation using the rest of symbols except 1 symbol. On the other hand, in case that a TA greater than a timing margin is applied, a UE can perform a D2D operation using the rest of symbols except 2 symbols. Alternatively, for convenience of the operation, the number of available symbols per one CP length can be fixed.

Meanwhile, the number of symbols usable for a D2D communication in a single D2D subframe may vary according to a length of a CP. For instance, assuming that a maximum TA value exists between 31 µs and 43 µs, D2D is performed in a manner of using 12 symbols by assuming that 2 symbols are always unusable in case of using a normal CP. On the other hand, D2D can be performed in a manner of using 11 symbols by assuming that 1 symbol is always unusable in case of using an extended CP.

In applying the embodiment of the present invention mentioned in the above description, a preamble may be transmitted before transmitting a D2D signal. In this case, the preamble means a signal transmitted for a separate purpose by a D2D transmitting UE before transmitting a regular D2D signal carrying a control information or a data information. In particular, the preamble may include a signal transmitted by the D2D transmitting UE for a reception preparation operation of a receiving UE before the D2D transmitting UE transmits the regular D2D signal carrying a control information or a data information. In this case, the regular D2D signal means a D2D signal for the D2D transmitting UE to deliver the control information or the data information. And, the reception preparation operation includes time/frequency synchronization.

Generally, the preamble is the signal known to transmitting and receiving UEs in advance. The preamble is transmitted for an advance preparation process (or a reception preparation process) of the receiving UE before the regular signal reception. Hence, if a transmission time is enough for the advance preparation process, it is unnecessary to occupy a time corresponding to at least one OFDM symbol. The advance preparation process includes time/frequency synchronization acquisition, gain adjustment of a receiving amplifier, and the like.

In the following description, a method of adjusting the number of available symbols by adjusting a start timing point of a D2D operation in case of applying a preamble is explained.

Figure 14:
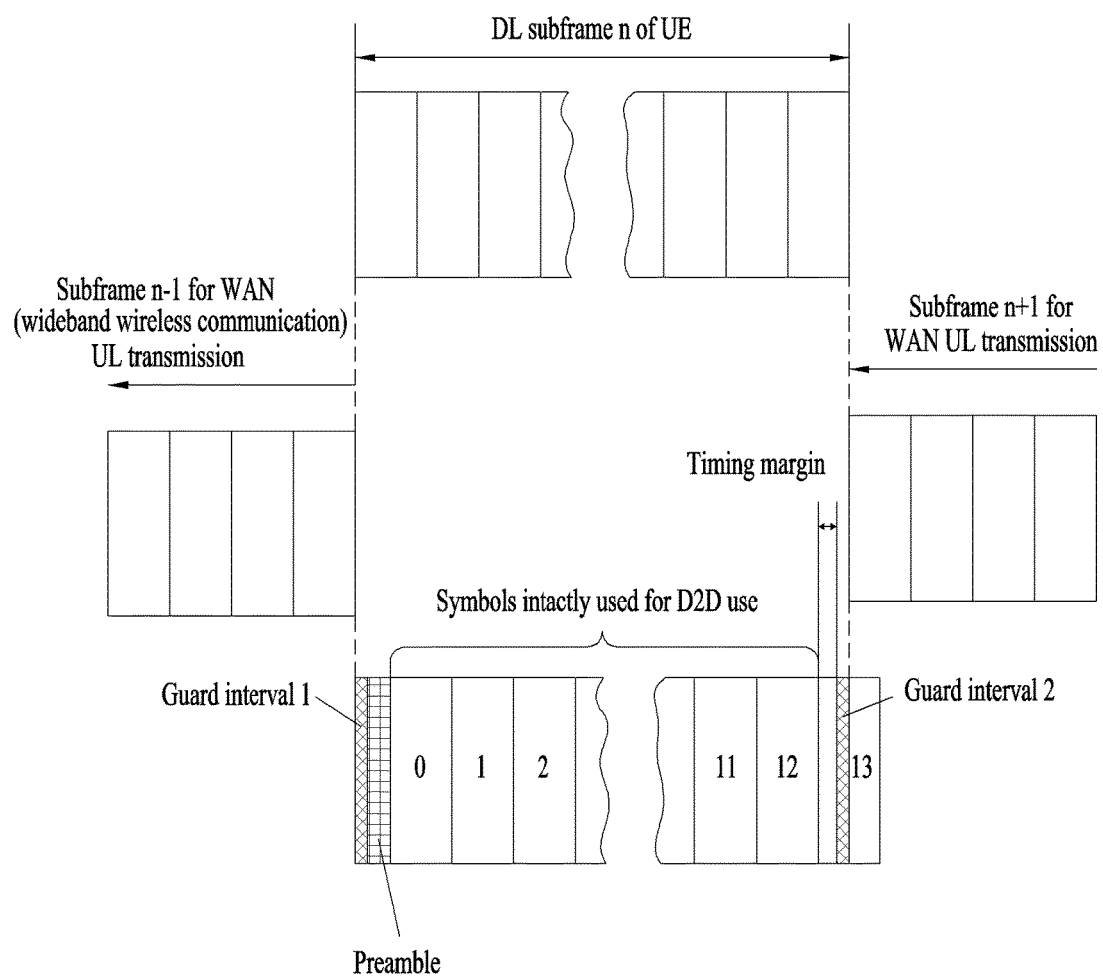
FIG. 14 is a diagram to describe a start timing point of a D2D operation according to an embodiment of the present invention in case of applying a preamble.

FIG. 14 is a diagram to describe a start timing point of a D2D operation according to an embodiment of the present invention in case of applying a preamble.

In this case, a timing margin value is a value amounting to {(1 symbol duration)−(sum of a length of 2 guard intervals and a length of preamble)}. Hence, a timing margin is reduced in comparison with that shown in FIG. 12. For instance, assuming that a length of a preamble is 20 µs, a timing margin is 11 µs (=31 µs−20 µs) in case of a normal CP or a timing margin is 23 µs (=43 µs−20 µs) in case of an extended CP. Likewise, in this case, a UE can adjust the number of symbols available for the UE in accordance with a timing margin and a TA value of the UE or the number of available symbols may be determined in accordance with a CP length.

Typically, if a length of a preamble reaches a predetermined level, since there is almost no margin in a normal CP, an operation can be performed in a manner that 12 symbols except 2 symbols are always used. On the other hand, in case of an extended CP, an operation can be performed in a manner that 12 symbols except 1 symbol are used. FIG. 14 corresponds to a case that a TA is set to a value located in the middle of timing margins in two different CP lengths. As a result, last 2 symbols are unavailable in case of a normal CP, while last 1 symbol is unavailable in an extended CP.

In the following description, a method of adjusting the number of available symbols using a TA is explained.

Figure 15:
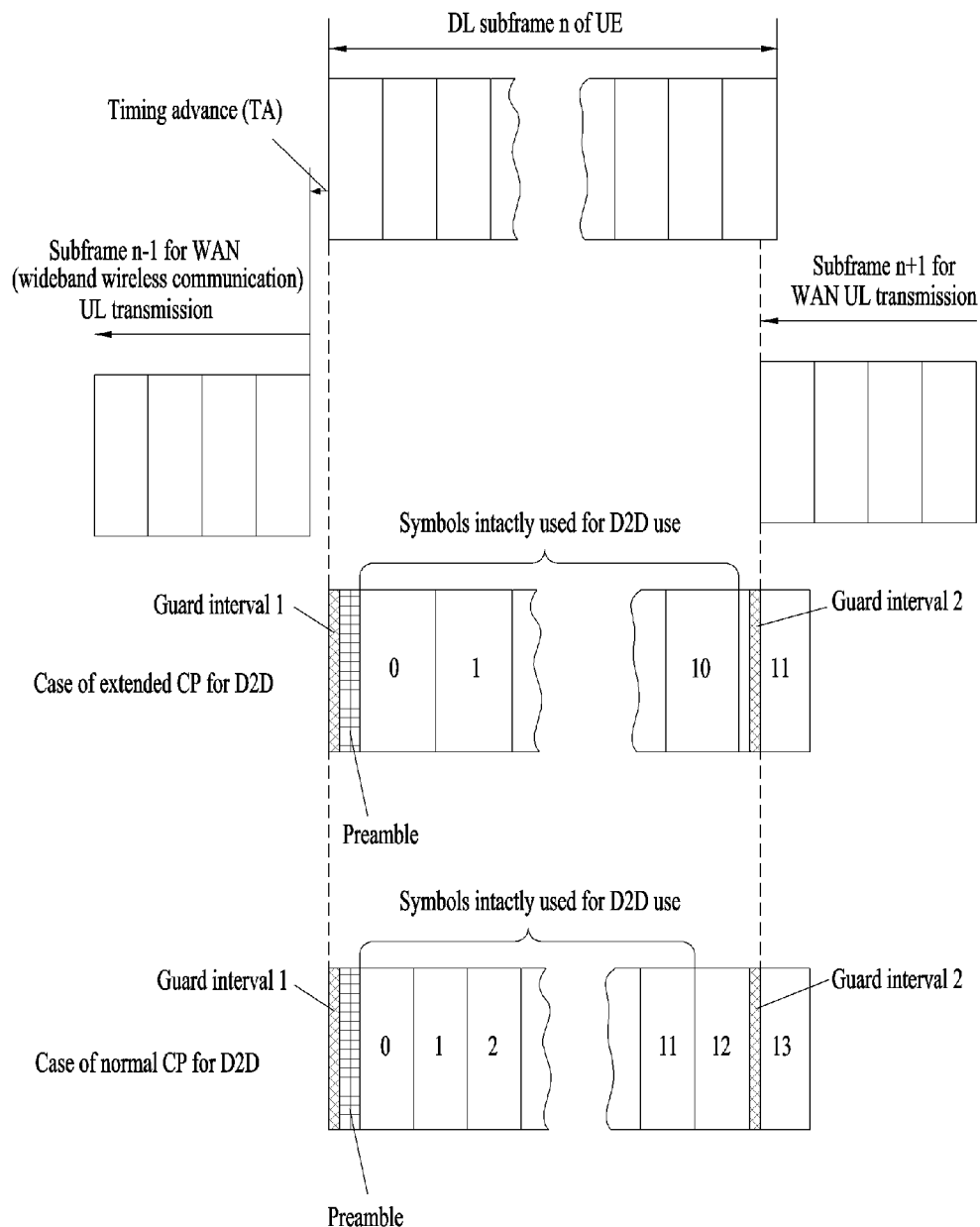
FIG. 15 and FIG. 16 are diagrams to describe a start timing point of a D2D operation according to an embodiment of the present invention in case of using TA.
Figure 16:
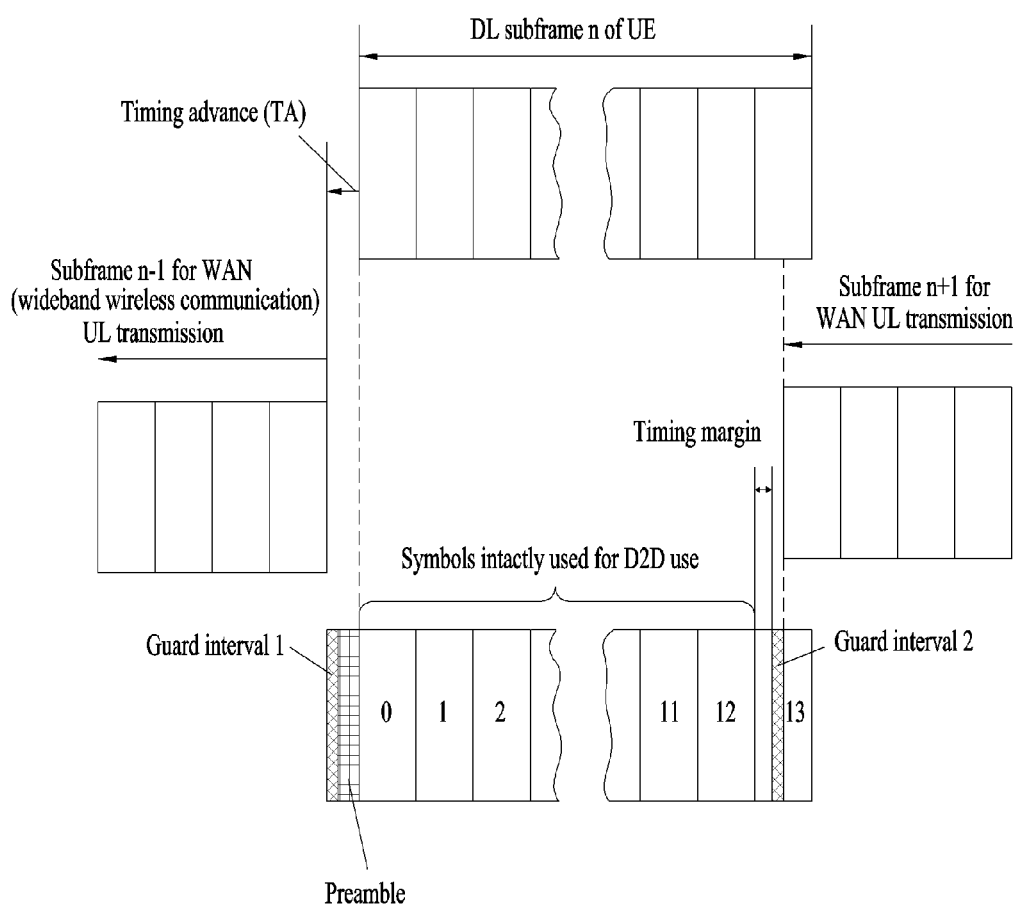

FIG. 15 and FIG. 16 are diagrams to describe a start timing point of a D2D operation according to an embodiment of the present invention in case of using TA.

According to the former description of TA, a case of using a TA may correspond to a D2D communication procedure in a D2D operation. In this situation, as shown in FIG. 15, a transmitting UE can transmit a D2D signal from a timing point at which a guard interval 1 expires with reference to a boundary of its UL subframe. The transmitted signal arrives at a receiving UE at a timing point at which a propagation delay between the transmitting UE and the receiving UE expires.

Whether a last D2D signal having arrived at the receiving UE through a propagation delay can exist before the beginning of a guard interval 2 is determined, as shown in FIG. 16, by a timing margin value. In this case, the timing margin value corresponds to {(1 symbol duration)−(sum of length of 2 guard intervals and length of preamble)}. Referring to FIG. 15, there is an effect that a timing margin increases in proportion to a CP length. A timing margin value in case of an extended CP is longer than a timing margin value in case of a normal CP. Hence, like the case mentioned in the foregoing description, a UE can operate in a manner of distinguishing available symbols and unavailable symbols from each other in D2D subframe in consideration of a given timing margin.

Meanwhile, a length of a preamble may vary according to a purpose of a transmitted signal. In case of a D2D communication procedure for transmitting a number of bits, since an operation of decoding a lot of bits at a time is relatively complicated, the receiving UE may operate to detect a single D2D communication signal only from a single subframe. In doing so, it may be able to attempt more elaborate time/frequency synchronization at an individual transmitter using the preamble. To this end, such a synchronization job can be performed smoothly by assigning more time to a preamble transmission in the D2D communication procedure.

On the other hand, in case of a D2D discovery procedure, since it is enough to provide basic information on a corresponding UE only, a transmission of a limited number of bits is performed in general. As a result, a relatively small quantity of frequency resources is enough for a discovery signal of a single UE. Hence, in order to raise the resource utilization, it is preferable that a multitude of UEs transmit discovery signals together in a single subframe. This means that a receiving UE should receive the discovery signals of a multitude of the UEs in a single subframe. In doing so, in order for the receiving UE to perform a time/frequency synchronization on the discovery signal of the individual UE, excessive complexity may be required.

As an alternative for this, the receiving UE performs synchronization on a whole signal generated from multiplexing signals of several UEs only (e.g., regarding synchronization as performed on an average of time/frequency of individual UE) and operates not to pursue a remaining error with an individual UE signal, whereby implementation of UE can be simplified. Thus, if an operation of receiving a D2D discovery signal is performed, a transmission of a preamble becomes unnecessary overall. Hence, in order to skip a transmission of a preamble or use a transmission of a preamble for the purpose of obtaining a reception power of a signal only, a length of the preamble can be set shorter than that of the D2D communication procedure.

Meanwhile, the number of available symbols may vary depending on whether a D2D signal transmission/reception occurs inside or outside a network (or coverage). If a transmission of symbol #0 corresponding to a first D2D signal symbol in a subframe n starts before expiration of a single symbol duration from an end timing point of a subframe n−1, as shown in FIG. 16, since more timing margin can be obtained, it brings an effect that symbol #12 corresponding to a last $2^{nd}$ symbol is becomes available. Yet, as such a signal transmission scheme mismatches a symbol timing used by a general UE-eNB signal in the corresponding subframe n, inter-carrier interference is generated.

Figure 17:
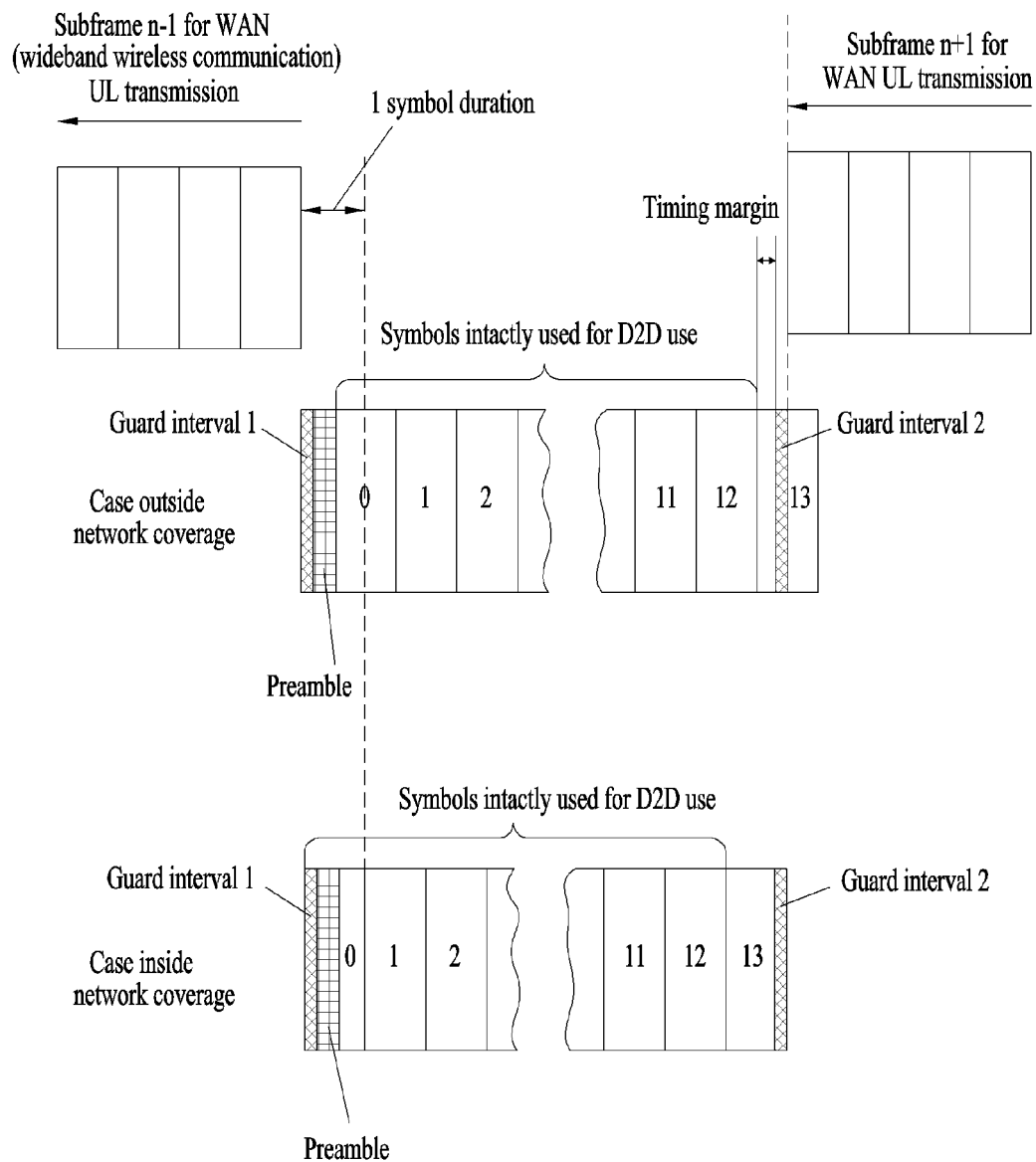
FIG. 17 is a diagram to describe a start timing point of a D2D operation of a user equipment inside or outside a network.

Therefore, depending on whether a D2D transceiving user equipment is located inside or outside a network, as shown in FIG. 17, it is able to determine a start timing point of a D2D operation and the number of available symbols.

In D2D signal transmission/reception outside a network, from which a problem of interference with UE-eNB signal is not generated, as shown in FIG. 16, it is able to increment the number of available symbols in a manner of using am operation of starting a transmission of symbol #0 corresponding to a first D2D signal symbol before expiration of 1 symbol duration from an end timing point of a subframe n−1.

On the other hand, in order to maintain the same timing of a UE-eNB signal inside a network, it is able to regulate a transmission of symbol #0 corresponding to a first D2D signal symbol to start at a timing point of expiration of 1 symbol duration from an end timing point of a subframe n−1. This may be construed as transmitting a regular D2D signal (e.g., signal except a preamble) from symbol #1 in a situation that a symbol timing in subframe n is set to the same symbol timing of a UE-eNB link.

Such an execution of the above-mentioned operation is non-limited by the case of the D2D communication and may be applied to a case of a transmission/reception between a base station and a user equipment. For instance, such an execution of the above-mentioned operation can be applied to a transmission/reception between a base station and a user equipment in LTE system of an unlicensed band. Particularly, in the above-described LET system of the unlicensed band, the base station can transmit a preamble to the user equipment. In an existing LTE system, a user equipment recognizes synchronization by periodically transmitting a reference signal. Yet, in LET system of the unlicensed band, the base station does not perform a transmission consistently on the corresponding band. Hence, it is able to perform synchronization and the like by transmitting a preamble in advance before transmitting a signal.

Meanwhile, as mentioned in the foregoing description, in case of switching to the unlicensed band use or switching to the D2D communication, some resources may be restricted from being used. In the following description, proposed is another method of easing such restriction. Yet, for clarity of the following description, a communication between a base station and a user equipment is assumed.

Method 2: Adjustment of Length of Preamble

In case that a base station transmits a preamble to a user equipment, one major operation performed through the preamble is an operation of enabling a received signal to be applied to a received signal processing circuit in appropriate size in a manner that a receiving UE obtains a reception power level of a following signal and then adjusts its reception circuit, and more particularly, automatic gain control (AGC) to fit the obtained reception power level. In general, for the operation of the AGC, a sufficient number of sample signals are required. The reason for this is to obtain a reception power of a following signal by observing a reception power of a sample signal configuring a preamble and then taking an average thereof.

Yet, a length of 1 OFDM (or SC-FDM) signal sample varies according to a system bandwidth presumed in a corresponding signal transmission/reception and a length of 1 signal sample increases in inverse proportion to the system bandwidth. In particular, the number of samples increases more. Hence, assuming that a fixed number of samples should be used as preambles for a stable AGC operation, a time occupied by a preamble may be permissibly short in a situation that a system bandwidth is large. In this case, a shorter time may be taken for the AGC. On the contrary, in case that a system bandwidth is small, a preamble needs to occupy a long time so that a sufficient number of samples (or a fixed number of samples) appear in the preamble. In this case, more time may be taken for the AGC.

In this case, the system bandwidth presumed in the signal transmission/reception means a system bandwidth used when a base station or UE performs OFDM (or SC-FDM) modulation/demodulation on a specific signal. And, the corresponding signal may be transmitted using a portion of subcarriers belonging to the system bandwidth. In another sense, although a size of frequency resource occupied by a signal is same (i.e., a signal is transmitted using the same number of subcarriers), a length of a preamble for operating AGC may vary in accordance with a size of a bandwidth used by a whole system.

Therefore, a time for operating AGC can be adjusted as well by adjusting a length of a preamble according to a system bandwidth presumed in a signal transmission/reception. In particular, a length of a preamble can be adaptively adjusted according to a system bandwidth. As a result, in case that a system bandwidth is large, it is able to transmit data fast in a subframe by transmitting a preamble in short length.

Method 3: Nulling by Sample Unit

Meanwhile, in the case shown in FIG. 11, if a receiving UE (or a base station) performs a general received signal processing, it is impossible to use a first or last symbol including a guard interval intactly. Yet, it is able to utilize a portion of the corresponding symbol through an appropriate processing only.

For instance, by nulling a sample included in a guard interval (i.e., assuming that a signal corresponding 0 is received), it is able to process a received signal. In particular, assuming that the signal corresponding to 0 in the sample is received, it is able to process the received signal. Through this, it is able to bring an effect that a signal distortion occurring in the guard interval can be removed in the signal processing procedure.

Typically, a transmitting UE (or base station) regards a corresponding symbol (e.g., first symbol, last symbol, etc.) as an intact symbol and then transmits a signal in all samples. On the other hand, a UE having received the signal may null predetermined samples. On the contrary, a UE regards a corresponding symbol (e.g., first symbol, last symbol, etc.) as an intact symbol and then transmits a signal in all samples. On the other hand, a base station having received the signal may null predetermined samples.

In doing so, in viewpoint of the signal receiving UE or base station, a series of time for an AGC operation is required after a transmission/reception operating switching through a guard interval. And, as mentioned in the foregoing description, the time required for the AGC operation may vary according to a system bandwidth presumed in the signal transmission/reception. As a result, although the number of samples nulled in the $1^{st}$ or last symbol of the subframe is constant, if the system bandwidth is wide, since the number of samples transmitted per unit time increases, the time required for the AGC operation may be shortened in viewpoint of the receiving UE or base station. In particular, the time required for the AGC operation may also vary according to the system bandwidth presumed in the signal transmission/reception. For instance, if the system bandwidth gets smaller, samples in a longer time interval are nulled. As a result, the smaller number of samples may be utilized for the signal demodulation.

If a preamble is provided for the purpose of an operation of AGC only, a general signal (e.g., a signal to be transmitted in a corresponding symbol in case of absence of a guard interval) may be transmitted without transmitting a specific sequence. In this case, since a guard interval includes a time for AGC as well as a time for the switching between transmission and reception operations, a length of the guard interval may appear in a manner of varying according to a system bandwidth presumed in a signal transmission/reception.

Meanwhile, if some samples of the $1^{st}$ and/or last symbol are nulled in accordance with the above-described operation, reception performance of the corresponding symbol may be lowered. Hence, it is preferable that a significant signal is mapped by avoiding a symbol of which samples are nulled in part. For example, the significant signal may include a reference signal used for channel estimation.

Figure 18:
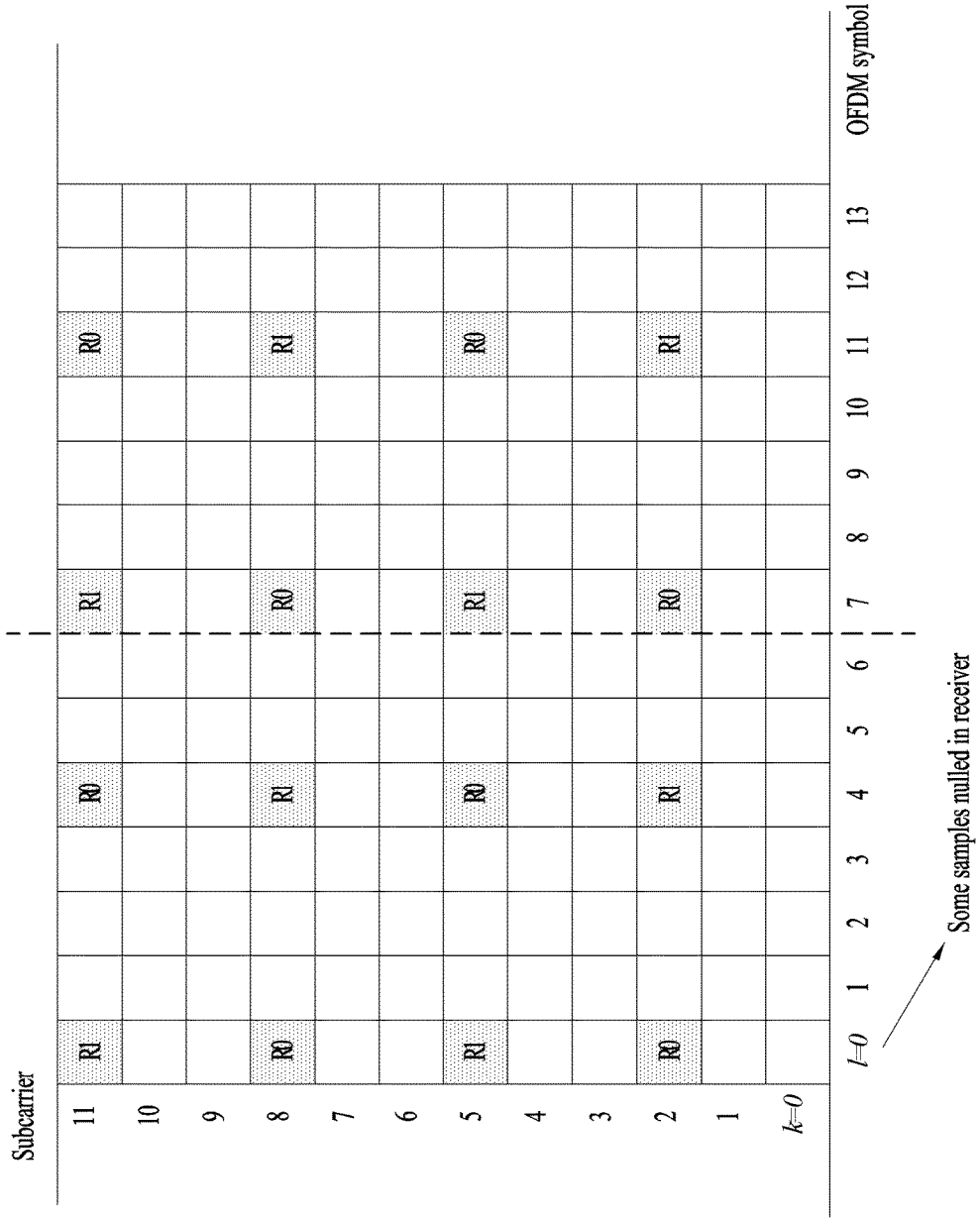
FIG. 18 is a diagram for one example of a CRS pattern according to one embodiment of the present invention.
Figure 19:
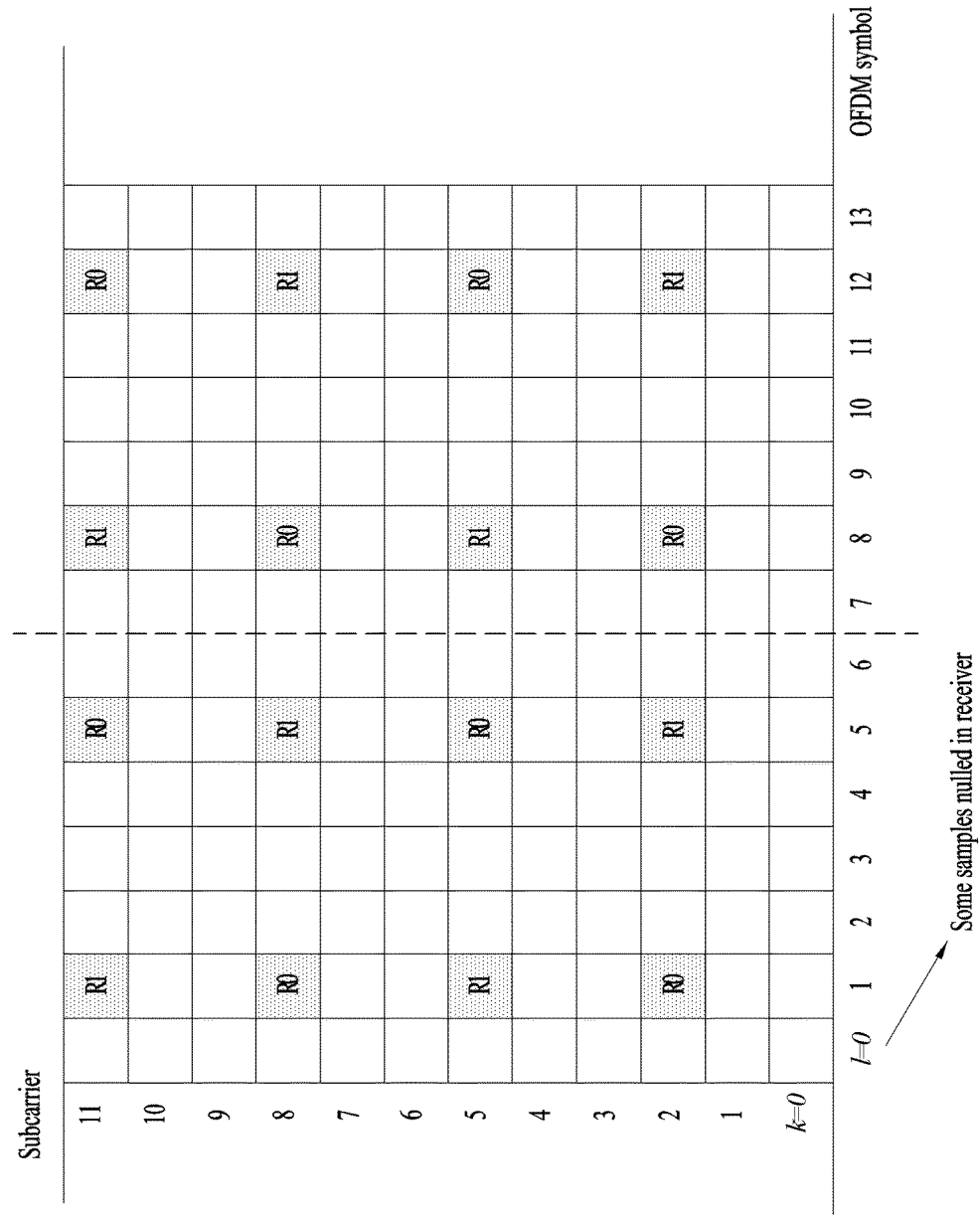
FIG. 19 is a diagram for one example of a CRS pattern according to another embodiment of the present invention.

FIG. 18 is a diagram for one example of a CRS pattern according to one embodiment of the present invention. And, FIG. 19 is a diagram for one example of a CRS pattern according to another embodiment of the present invention.

For instance, if a transmission/reception operation based on a CRS used for PDSCH of an existing 3GPP LTE is applied to signal transmission/reception, an existing CRS mapped to a $1^{st}$ symbol shown in FIG. 8 is shifted by 1 symbol overall, whereby some samples of a reference signal can be prevented from being nulled. Thus, an operation of mapping a reference signal by avoiding a $1^{st}$ or last symbol of a subframe can be applied to a case of mapping a random reference symbol.

Figure 20:
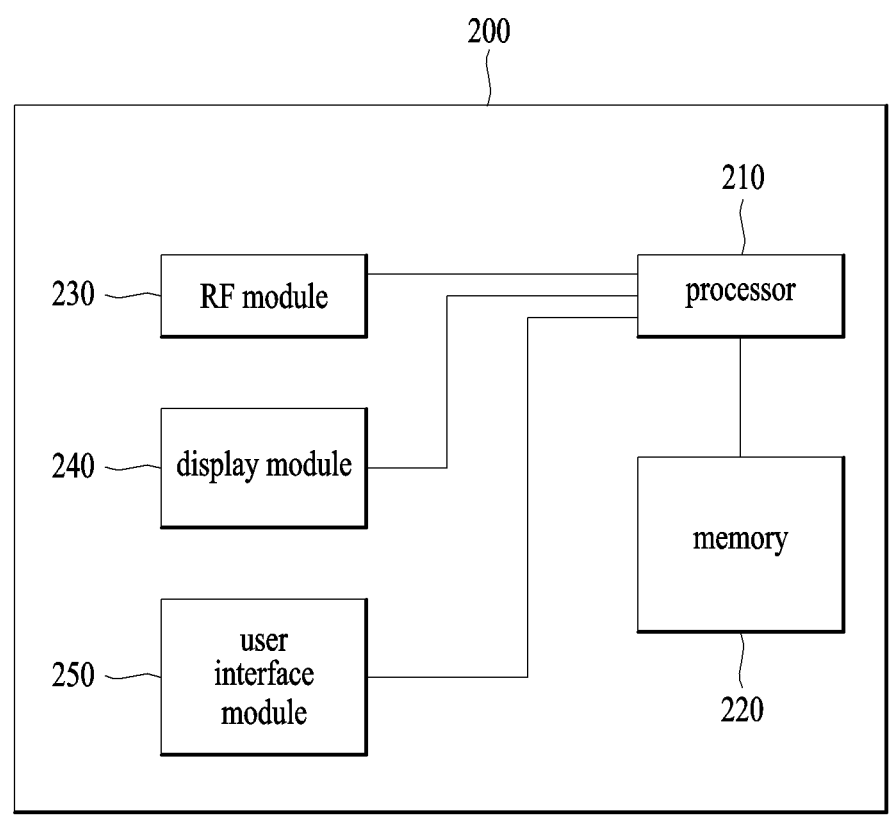
FIG. 20 is a block diagram for configurations of a communication device according to one embodiment of the present invention.

FIG. 20 is a block diagram for configurations of a communication device according to one embodiment of the present invention.

Referring to FIG. 20, a communication device 200 includes a processor 210, a memory 220, an RF module 230, a display module 240 and a user interface module 250.

The communication device 200 is illustrated for clarity and convenience of the description and some modules can be omitted. Moreover, the communication device 200 may further include necessary modules. And, some modules of the communication device 200 can be further divided into sub-modules. The processor 210 is configured to perform operations according to the embodiment of the present invention exemplarily described with reference to the accompanying drawings. In particular, the detailed operations of the processor 210 can refer to the contents described with reference to FIGS. 1 to 19.

The memory 220 is connected to the processor 210 and stores an operating system, applications, program codes, data and the like. The RF module 230 is connected to the processor 210 and performs a function of converting a baseband signal to a radio signal or converting a radio signal to a baseband signal. To this end, the RF module 230 performs analog conversion, amplification, filtering and frequency uplink transform or inverse processes thereof. The display module 240 is connected to the processor 210 and displays various kinds of informations. The display module 240 can include such a well-known element as LCD (Liquid Crystal Display), LED (Light Emitting Diode), OLED (Organic Light Emitting Diode) and the like, by which the present invention is non-limited. The user interface module 250 is connected to the processor 210 and can include a combination of well-known interfaces including a keypad, a touchscreen and the like.

The above-described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of the appended claims or that those claims can be included as new claims by revision after filing an application.

Embodiments of the present invention can be implemented using various means. For instance, embodiments of the present invention can be implemented using hardware, firmware, software and/or any combinations thereof. In case of the implementation by hardware, a method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of transceiving signals using D2D communication in a wireless communication system and apparatus therefor are described mainly with reference to examples applied to 3GPP LTE system, as mentioned in the foregoing description, the present invention is applicable to various kinds of wireless communication systems as well as to the 3GPP LTE system.

What is claimed is:
1. A method of transmitting a signal from a transmitting end to a receiving end in a wireless communication system, the method comprising:
   transmitting a preamble; and
   transmitting the signal,
   wherein a length of the preamble is determined based on a bandwidth of the wireless communication system, wherein the preamble is used for an automatic gain control of the signal, wherein the preamble is transmitted in either a first symbol or a last symbol included in at least one subframe having the signal transmitted therein, and wherein a prescribed sample of either the first symbol or the last symbol is nulled by the receiving end and wherein the prescribed sample is included in a guard interval.

2. The method of claim 1, further comprising transmitting a reference signal to the receiving end, wherein the reference signal is transmitted in at least one of the rest of symbols except either the first symbol or the last symbol.

3. The method of claim 2, wherein the reference signal includes a cell-specific reference signal (CRS).

4. A method of receiving a signal transmitted from a transmitting end to a receiving end in a wireless communication system, the method comprising:

receiving a preamble; and receiving the signal, wherein a length of the preamble is determined based on a bandwidth of the wireless communication system, wherein the preamble is used for an automatic gain control of the signal, wherein the preamble is received in either a first symbol or a last symbol included in at least one subframe having the signal transmitted therein, and wherein a prescribed sample of either the first symbol or the last symbol is nulled by the receiving end and wherein the prescribed sample is included in a guard interval.

5. The method of claim 4, further comprising the step of receiving a reference signal from the transmitting end, wherein the reference signal is transmitted in at least one of the rest of symbols except either the first symbol or the last symbol.

6. A method of transmitting a signal from a transmitting end to a receiving end in a wireless communication system, the method comprising:

assigning a specific subframe for a transmission of the signal;

determining a timing margin for the transmission of the signal;

determining an available symbol and transmission timing point of the specific subframe based on the timing margin; and transmitting the signal through the available symbol at the transmission timing point.

7. The method of claim 6, wherein if a timing advance applied to the receiving end is greater than the timing margin, the available symbol corresponds to symbols except 2 symbols in the specific subframe and wherein if the timing advance applied to the receiving end is smaller than the timing margin, the available symbol corresponds to symbols except 1 symbol in the specific subframe.

8. The method of claim 6, wherein the timing margin amounts to a difference value between 1 symbol duration and a sum of a guard interval for an operation switching from a preceding subframe to the specific subframe and a guard interval value for an operation switching from the specific subframe to a following subframe.

9. The method of claim 6, further comprising transmitting a preamble, wherein the timing margin amounts to a difference value between 1 symbol duration and a sum of a guard interval for an operation switching from a preceding subframe to the specific subframe, a guard interval value for an operation switching from the specific subframe to a following subframe and a value of the preamble.

* * * * *